United States Patent
Dalli et al.

(10) Patent No.: US 11,256,989 B2
(45) Date of Patent: Feb. 22, 2022

(54) METHOD FOR DETECTING AND MITIGATING BIAS AND WEAKNESS IN ARTIFICIAL INTELLIGENCE TRAINING DATA AND MODELS

(71) Applicant: UMNAI Limited, Ta' Xbiex (MT)

(72) Inventors: Angelo Dalli, Floriana (MT); Mauro Pirrone, Kalkara (MT)

(73) Assignee: UMNAI Limited, Ta' Xbiex (MT)

( * ) Notice: Subject to any disclaimer, the term of this patent is extended or adjusted under 35 U.S.C. 154(b) by 0 days.

(21) Appl. No.: 17/370,466

(22) Filed: Jul. 8, 2021

(65) Prior Publication Data

US 2022/0012591 A1    Jan. 13, 2022

Related U.S. Application Data

(60) Provisional application No. 63/049,257, filed on Jul. 8, 2020.

(51) Int. Cl.
*G06N 3/08* (2006.01)
*G06K 9/62* (2006.01)
*G06N 3/04* (2006.01)

(52) U.S. Cl.
CPC .......... *G06N 3/082* (2013.01); *G06K 9/6202* (2013.01); *G06K 9/6232* (2013.01); *G06K 9/6263* (2013.01); *G06K 9/6298* (2013.01); *G06N 3/0481* (2013.01)

(58) Field of Classification Search
CPC .... G06N 3/082; G06N 3/0481; G06K 9/6202; G06K 9/6232; G06K 9/6263; G06K 9/6298
See application file for complete search history.

(56) References Cited

U.S. PATENT DOCUMENTS

2020/0104380 A1* 4/2020 Connell, II .......... G06F 16/355

OTHER PUBLICATIONS

Dimanov et al, "You Shouldn't Trust Me: Learning Models Which Conceal Unfairness From Multiple Explanation Methods", Jan. 29, 2020, University of Cambridge, DOI: 10.3233/FAIA200380, 11 pages (Year: 2020).*

* cited by examiner

*Primary Examiner* — David F Dunphy
(74) *Attorney, Agent, or Firm* — Maier & Maier, PLLC

(57) ABSTRACT

Bias may be detected globally and locally by harnessing the white-box nature of the eXplainable artificial intelligence, eXplainable Neural Nets, Interpretable Neural Nets, eXplainable Transducer Transformers, eXplainable Spiking Nets, eXplainable Memory Net and eXplainable Reinforcement Learning models. Methods for detecting bias, strength, and weakness of data sets and the resulting models may be described. A method may implement global bias detection which utilizes the coefficients of the model to identify, minimize, and/or correct potential bias within a desired error tolerance. Another method makes use of local feature importance extracted from the rule-based model coefficients to locally identify bias. A third method aggregates the feature importance over the results/explanations of multiple samples. Bias may also be detected in multi-dimensional data such as images. A backmap reverse indexing mechanism may be implemented. A number of mitigation methods are also presented to eliminate bias from the affected models.

30 Claims, 11 Drawing Sheets

Figure 1 – High-Level CNN-XNN Architecture

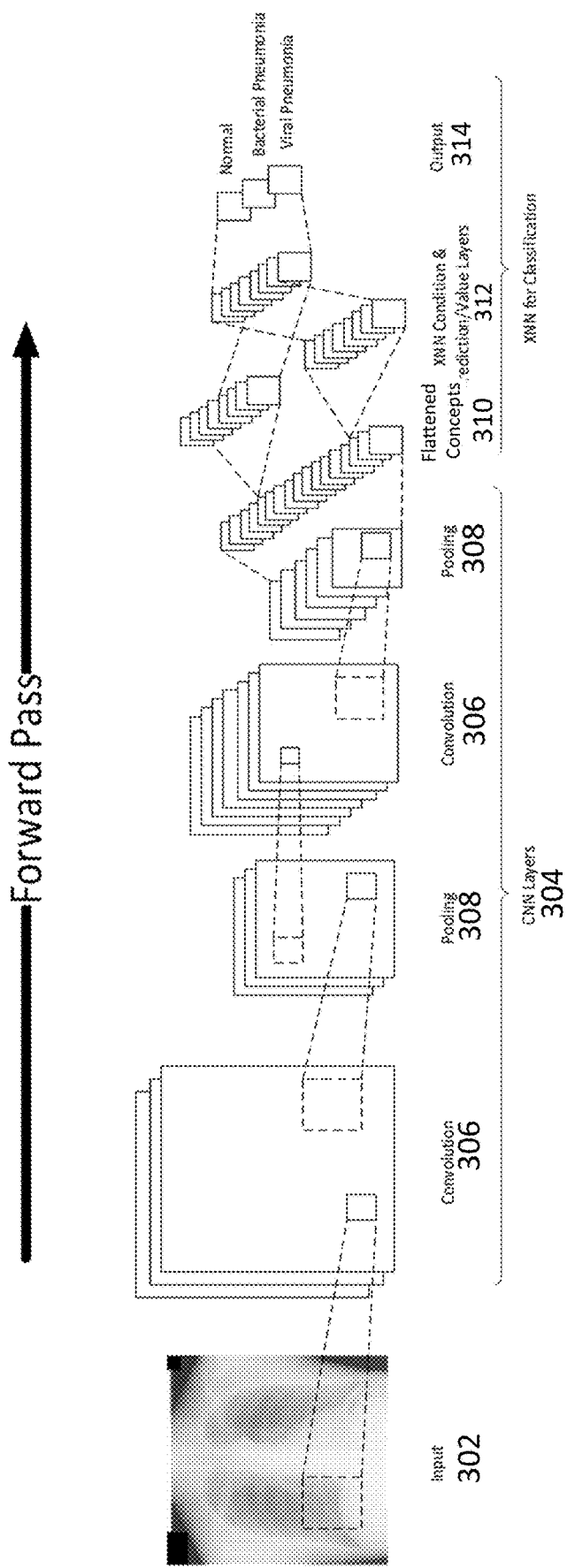
Figure 3A – Example of CNN-XNN Architecture

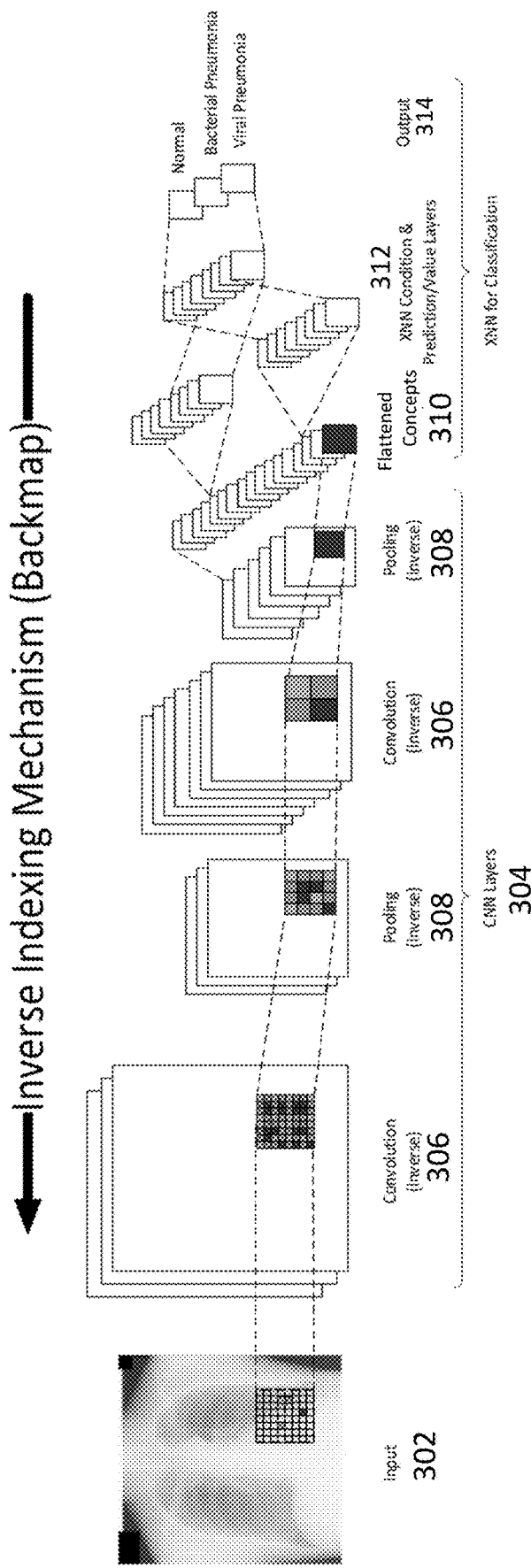
Figure 3B – Inverse Indexing Mechanism

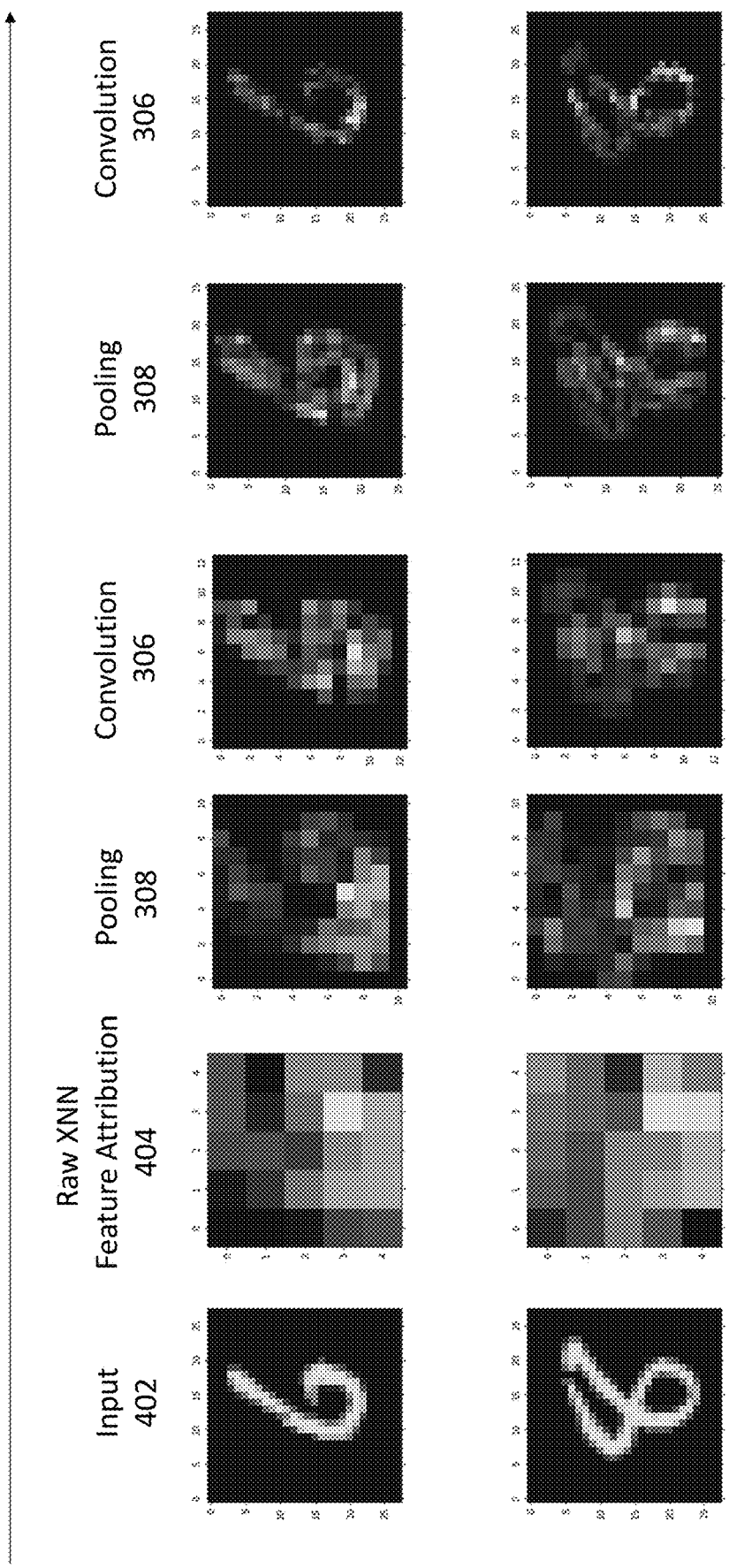
Figure 4A - Backmap for identifying bias / model verification

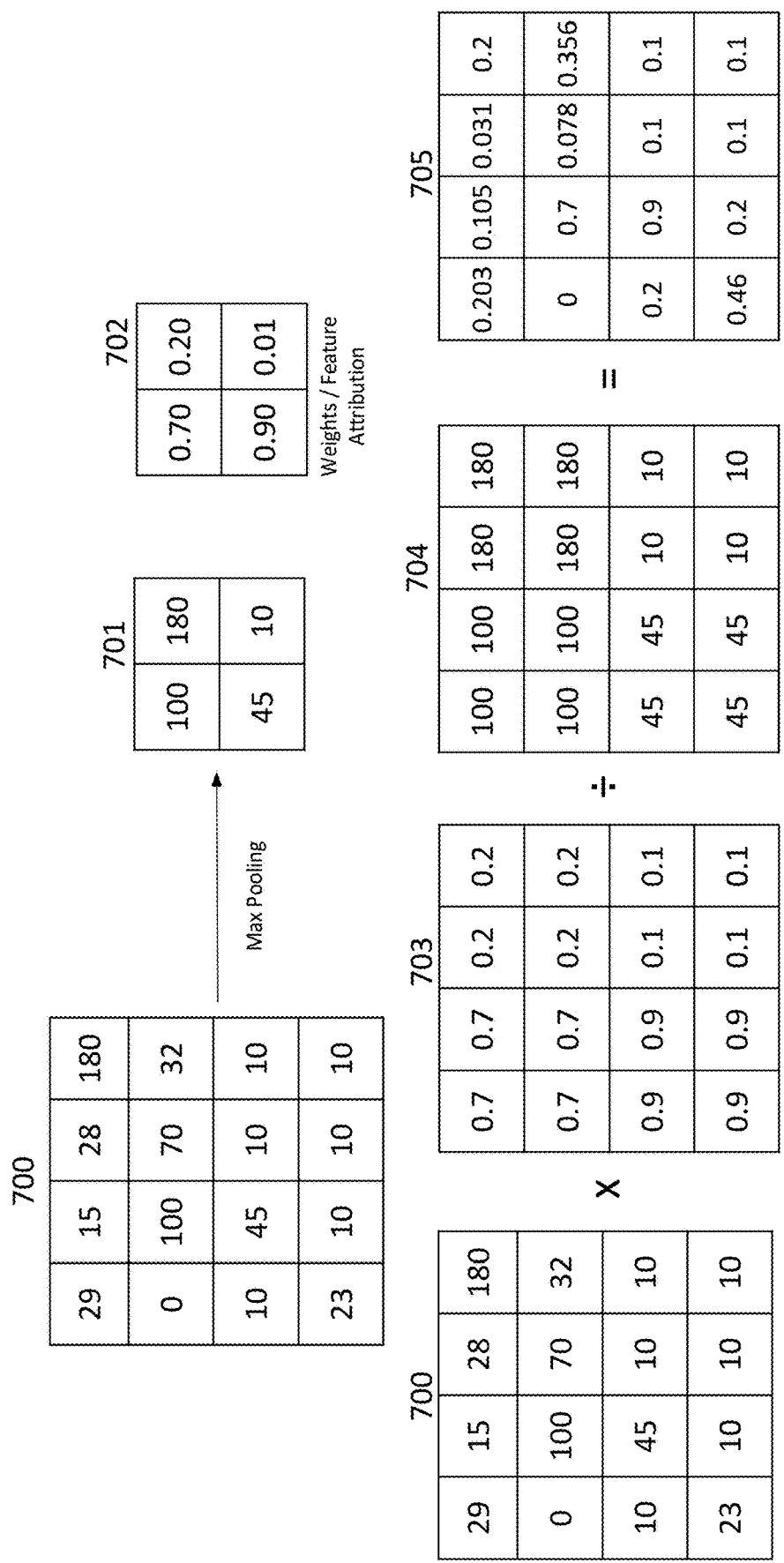
Figure 4B – Backmap for Pooling Layers with weight distribution

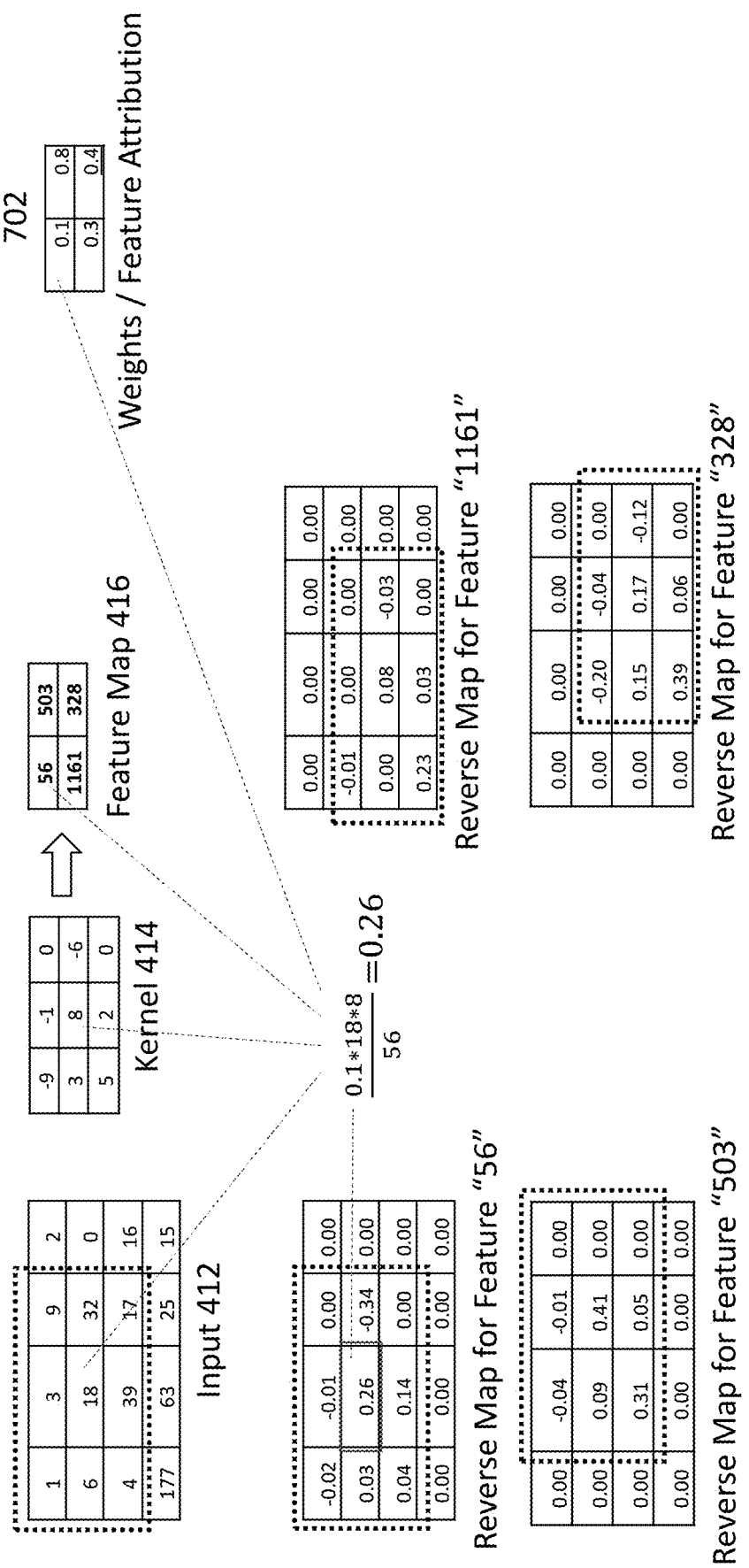
Figure 4C – Backmap for Convolutional Layers with weight distribution

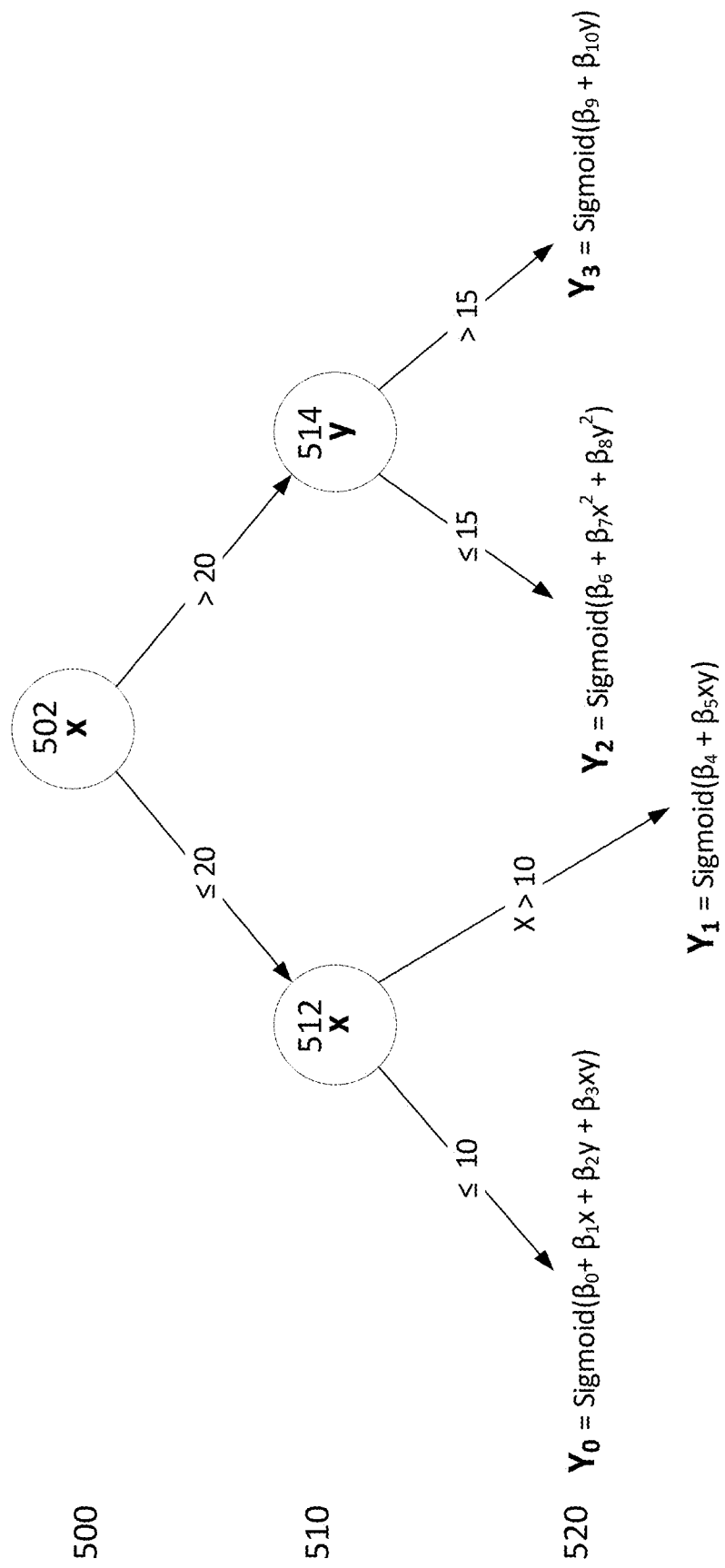
Figure 5: Exemplary XAI Model

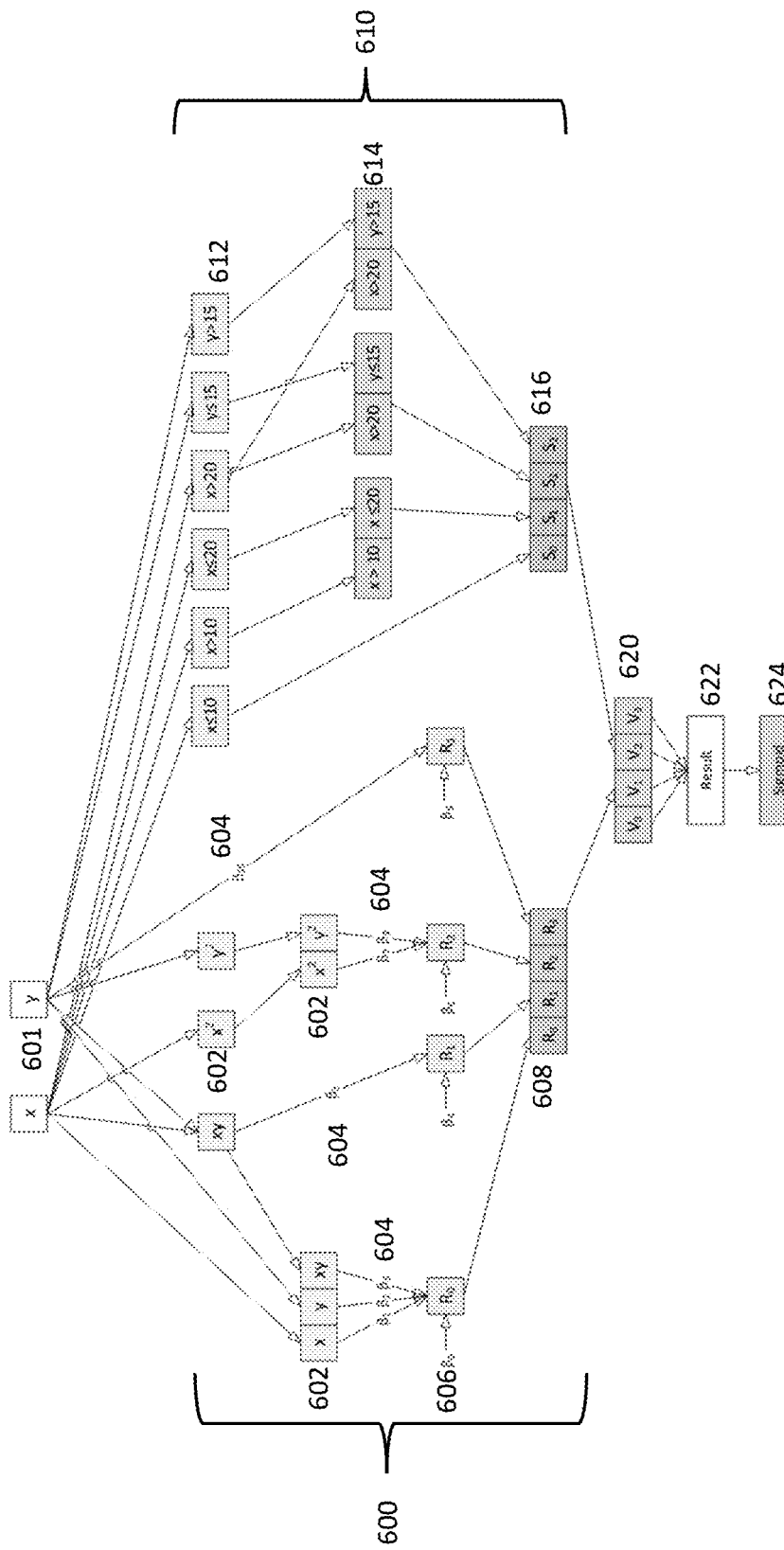
Figure 6: Exemplary XNN in Sparse format

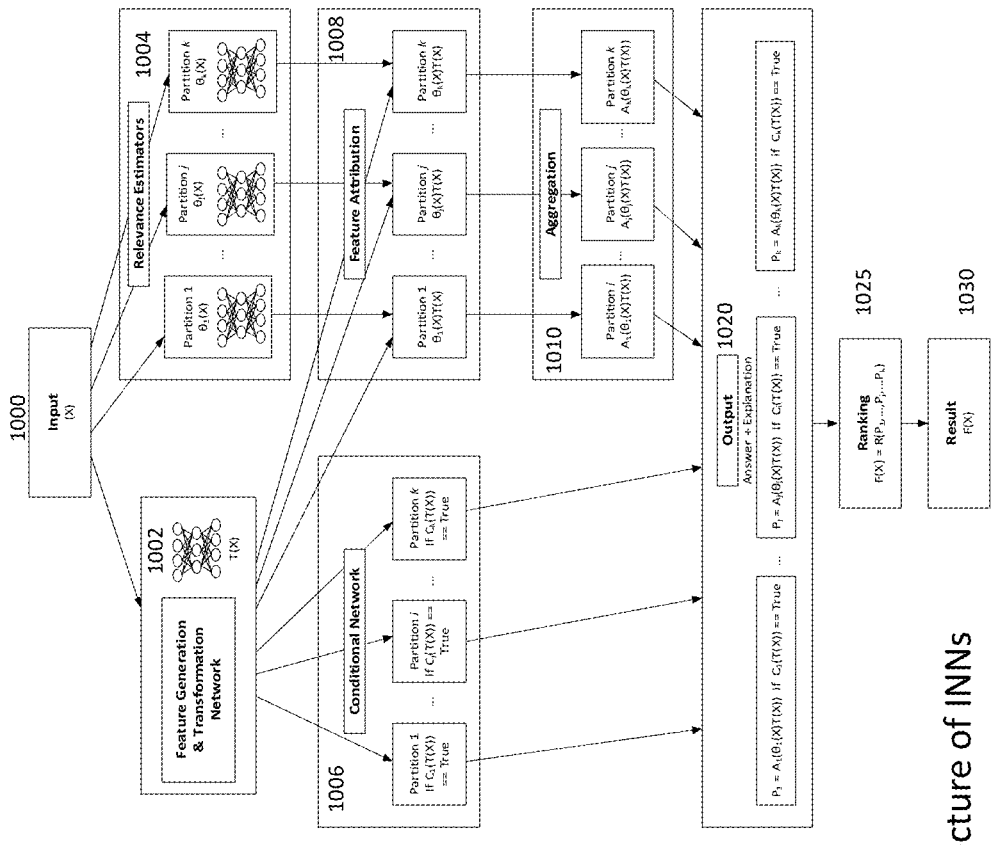
Figure 7 – General Architecture of INNs

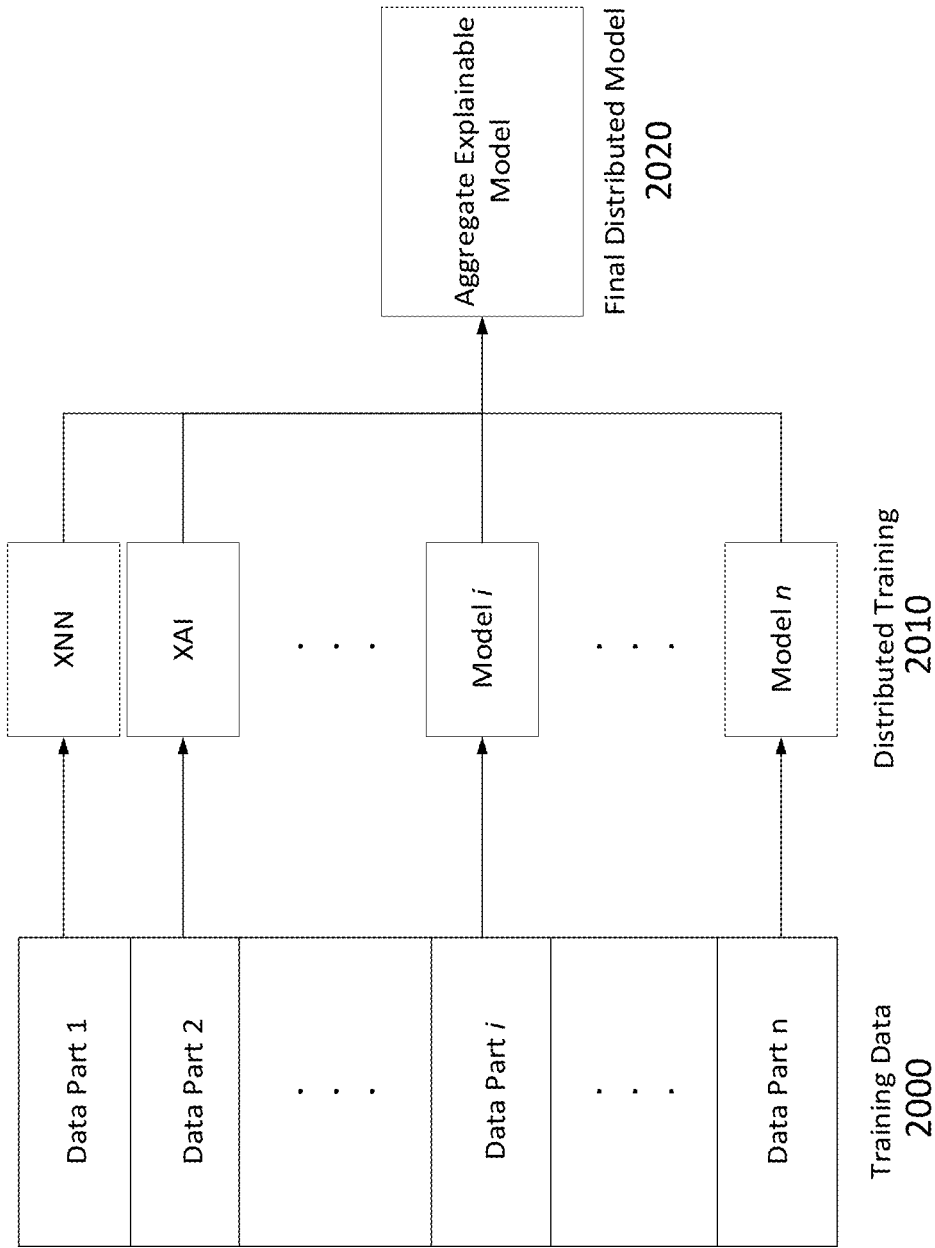

METHOD FOR DETECTING AND MITIGATING BIAS AND WEAKNESS IN ARTIFICIAL INTELLIGENCE TRAINING DATA AND MODELS

CROSS-REFERENCE TO RELATED APPLICATIONS

The present patent application claims benefit and priority to U.S. Patent Application No. 63/049,257, filed on Jul. 8, 2020, which is hereby incorporated by reference into the present disclosure.

FIELD

An exemplary embodiment relates to the field of artificial intelligence.

BACKGROUND

AI systems in general are only as good as the data put into them. Machine learning models are typically built through some statistical process which ends up generally biasing the learnt model towards the data on which the model has been trained on. In some cases, the bias is appropriate, or it may be ignored, whereas in other cases the bias may be unacceptable and/or unintentional, and thus crucial to be eliminated or somehow mitigated. Bias may be created in several ways. It may be created unconsciously by a lack of data (sparse training data) or imbalanced training data, or it may also be created through an algorithmic error which causes the model to be highly sensitive to noise or unknown data, or via systemic errors and other sources of errors that can skew and bias the resulting models.

Various methods have been proposed to solve the issue. For example, IBM's "AI Fairness 360" article (Bellamy, et al., 2018) presents three classes of bias mitigation algorithms, namely pre-processing, in-processing and post-processing algorithms. The algorithms included the following rules to determine the appropriateness and applicability of each type of algorithm according to the use case. First (i), if the algorithm is allowed to modify the training data, then pre-processing algorithms can be used. Second (ii), if the algorithm is allowed to change the learning process, then in-processing algorithms can be used. Finally (iii), if the algorithm can only treat the learned model as a black-box without any ability to modify the training data or learning algorithm, then only post-processing algorithms can be used.

Data pre-processing algorithms are those that process the data before it is used as an input to a system. For example, "Data Preprocessing Techniques for Classification Without Discrimination," (Kamiran & Calders, 2012) details the process of reweighing, or the generation of weights for the training examples in each (group, label) combination differently to ensure fairness before classification. "Optimized Preprocessing for Discrimination Prevention" (Calmon et al., 2017) teaches a probabilistic transformation that edits the features and labels in the data with group fairness, individual distortion, and data fidelity constraints and objectives. "Learning Fair Representations" (Zemel et al., 2013) finds a latent representation that encodes the data well but obfuscates information about protected attributes. "Certifying and Removing Disparate Impact" (Feldman et al., 2015) provides for a system which edits feature values to increase group fairness while preserving rank-ordering within groups.

In-processing algorithms modify the algorithm to better handle errors in the data. "Mitigating Unwanted Biases with Adversarial Learning" (Zhang et al., 2018) teaches the use of a classifier to maximize prediction accuracy and simultaneously reduce an adversary's ability to determine the protected attribute from the predictions. This approach leads to a fair classifier as the predictions cannot carry any group discrimination information that the adversary can exploit. "Fairness-aware Classifier with Prejudice Remover Regularizer" (Kamishima et al., 2012) adds a discrimination-aware regularization term to the learning objective.

Post-processing algorithms may further extract information from the processed data. "Equality of Opportunity in Supervised Learning" (Hardt et al., 2016) solves a linear program to find probabilities with which to change output labels to optimize equalized odds. "On Fairness and Calibration" (Pleiss et al., 2017) optimizes over calibrated classifier score outputs to find probabilities with which to change output labels with an equalized odds objective. "Decision Theory for Discrimination-Aware Classification" (Kamiran et al., 2012) describes reject option classification which gives favorable outcomes to unprivileged groups and unfavorable outcomes to privileged groups in a confidence band around the decision boundary with the highest uncertainty.

SUMMARY

Bias in AI models occurs when the expected or actual reported values/answers from the model differ from the true underlying features or parameters being estimated or analyzed. Bias may be identified globally by analyzing the model itself, without the need to test any predictions. Bias may also be detected locally for a specific sample or group of data. Alternatively, global bias may also be extracted by aggregating bias results from multiple samples. Alternatively, global bias may also be detected for the entire data and model by analyzing the white-box model itself in its entirety, using the population sample and/or synthetic data methods to increase the samples to cover the whole model. For white-box models, the global model coverage can always be more extensive than a black-box model, as the resulting bias analysis can cover situations for which minimal or even no data samples are available or even exist yet. Indeed, one of the main advantages of an exemplary embodiment is the ability to perform bias detection and strength and weakness analysis based on a combination of local and global model analysis that is completely independent of input data samples, solving one of the main problems inherent in techniques such as Deep Learning and many other statistically-based machine learning methods. An exemplary embodiment may present methods for detecting bias both globally and locally by harnessing the white-box nature of the eXplainable artificial intelligence (XAI), eXplainable Neural Nets (XNN), eXplainable Transducer Transformer (XTT), eXplainable Spiking Nets (XSN) and eXplainable Memory Nets (XMN) models. A further exemplary embodiment may present methods for detecting bias both globally and locally by harnessing the white-box nature of eXplainable Reinforcement Learning (XRL).

An exemplary approach to bias detection and mitigation is via an in-processing algorithm which may allow the learning process to change and may incorporate a white-box model, without modifying the training data itself. This approach in combination with, for example, exemplary strength and weakness detection and mitigation methods, can allow pre-processing to take place. It is also contemplated that model verification and simulations may be implemented, thus facilitating post-processing. Post-processing may be applied to exemplary XAI/XNN/XTT/XSN/XMN models, although these types of algorithms may be inferior to in-processing and pre-processing as they might not take advantage of the white-box nature of the models.

An exemplary method may start by first converting the black-box model to a white-box model with an explainable format (XAI Model, XNN, XTT, XSN, XMN or other equivalent methods) via a suitable explainable AI induction method. Then, the white-box nature of the model may be leveraged to extract any potential bias.

Various methods for detecting the bias and weakness (and conversely the strength) of the data sets and also the resulting models may be described. A first exemplary method presents a global bias detection which utilizes the coefficients of the XAI/XNN/XTT/XSN/XMN model to identify any potential bias. A second exemplary method makes use of local feature importance extracted from the rule-based model coefficients in order to identify any potential bias locally. A third exemplary method aggregates the feature importance over the results/explanations of multiple samples. A fourth exemplary method presents a special method for detecting bias in multi-dimensional data such as images.

Further, a reverse indexing mechanism may be implemented, which we are calling backmaps. Backmaps can be used to identify any potential bias in the kernels, activation maps, branching layers and/or in the original input data. Examples of practical backmap usage using models trained with CNN-XNNs or CNN-XTTs may be presented.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 3A is a schematic flowchart of an exemplary CNN-XNN architecture.

FIG. 3B is a schematic flowchart of an exemplary CNN-XNN architecture.

FIG. 4A is an exemplary embodiment of a visual explanation generated via a backmap.

FIG. 4B shows an exemplary embodiment of the backmap operation for pooling layers.

FIG. 4C shows an exemplary embodiment of the backmap operation for convolutional layers.

FIG. 5 is an exemplary embodiment of a schematic flowchart illustrating an exemplary XAI Model.

FIG. 6 is an exemplary embodiment of a schematic flowchart illustrating an exemplary XNN Model.

FIG. 7 is a general architecture of an Interpretable Neural Network.

FIG. 8 is the high-level architecture of a Distributed Explainable Network

DETAILED DESCRIPTION

Figure 1:
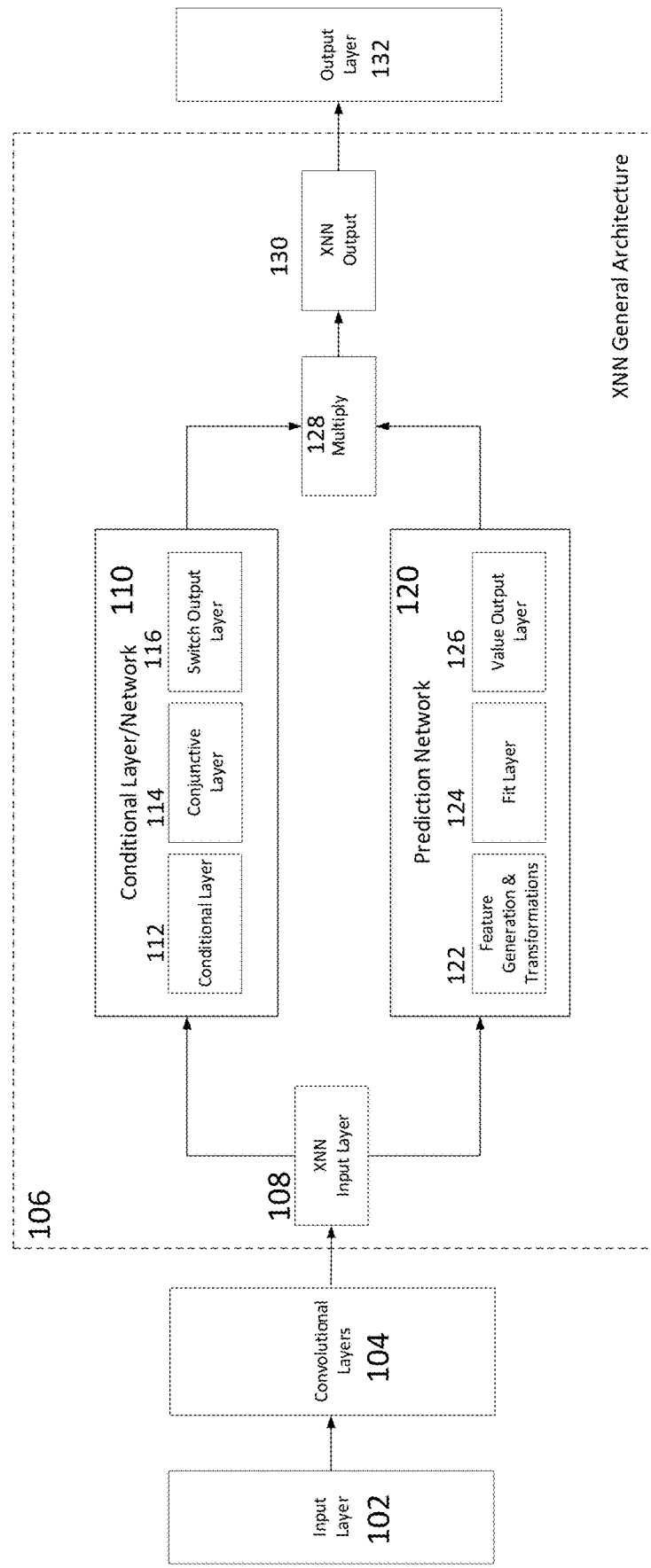
FIG. 1 is an exemplary embodiment of a high-level CNN-XNN architecture.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Exemplary embodiments may relate to bias detection in XAIs, XNNs, XTTs, XSNs and XMNs. Although some examples may reference one or more of these specifically (for example, only XAI or XNN), it may be contemplated that any of the embodiments described herein may be applied to XAIs, XNNs, XTTs, XSNs, or XMNs interchangeably. Another exemplary embodiment may relate to bias detection in Interpretable Neural Networks (INNs) and related grey-box models, which may be a hybrid mix between a black-box and white-box model. An exemplary embodiment may apply fully to the white-box part of the grey-box model and may apply to at least some portion of the black-box part of the grey-box model. It may be contemplated that any of the embodiments described herein may also be applied to INNs interchangeably. FIG. 7 shows an exemplary INN architecture.

Interpretable Neural Networks (INNs) provide an architecture which can automatically generate an explanation using existing deep learning techniques. INNs can utilize existing software infrastructures and hardware used for neural networks and are also remain fully compatible with backpropagation training techniques.

The architecture consists of a feature transformer which converts the input to some hidden features, and a number of relevance estimators which transform the hidden features to feature weights. The feature weights are then combined with the transformed input in order to extract the attribution of each input transformed feature. The resulting feature attributions are then aggregated for the result. Feature attribution may be extracted at different levels. In the simplest form, attribution may be linked directly with the original inputs. In other cases, such as CNNs, feature attribution may also be computed for higher-level features which are typically found in kernels and filters. Additionally, INNs may split the model in various partitions, thus enabling a higher-level of flexibility and interpretability, by enabling a mixture of local or segmented explainability. In some cases, INNs are also capable of providing global explainability.

Referring to FIG. 7, an exemplary architecture may start with some input vector X as shown in step 1000. Such input may then be connected to a feature generation and transformation network 1002 and to k relevance estimators 1004. The transformed features may be abstract or high-level features which could have been computed using a deep neural network such as CNN, a non-linear mathematical function such as polynomial expansion or a some other form of generated features, which may be discrete or continuous. The scope of the relevance estimator may be to calculate the coefficient, at least in a local manner, of each transformed feature.

In mathematical terms, the transformation network may be denoted as a function $T(X)$. Similarly, $\theta_j(X)$ represents the relevance function of the $j^{th}$ partition. If $X \rightarrow T(X)$ returns a vector with z transformed dimensions, then $X \rightarrow \theta_j(X)$ also returns a vector with z coefficients, or relevance weights. It may be assumed that $|T(X)|=|\theta_j(X)|=z$.

INNs may be flexible enough so as to allow modelling of complexity through various options and configurations. The functions $X \rightarrow T(X)$ and $X \rightarrow \theta_i(X)$ may be a deep neural network which makes it possible to model complex abstract features. Such network may also be an XNN, in order to have a white-box estimator. It may be noted that the combination of $T(X)$ and $\theta i(X)$ may represent various embodiments of explainable models which are possible to implement with the INN architecture.

In step 1006, the neural network may handle the conditional aspect of the model. That is, it evaluates rules in the form of IF-conditions in order to activate one or more partition. The output of $C_i(X)$ may be binary, that is 1 or 0. It may be noted that the partitions may be static or dynamic, and they may be discovered either through an external partitioning process or through a connected neural network. It may also be noted that INNs may also function with only one partition, that is for all values of X, $C_i(X)$ is always one (1). This may be equivalent to having zero partitions. In this exemplary case, there is no need to apply a partitioning method to find suitable partitions.

In step 1008, the neural network may compute the feature attribution of each transformed feature, which is activated by the associated partition. The relevance attribution works by multiplying the result of the computed coefficient with the transformed feature. In mathematical terms, step 1008 may compute $\theta_j(X)T(X)$ for the $j^{th}$ partition. The output of layer 1008 serves the basis of explanation generation. The values from this layer may be used to generate feature attribution graphs, heatmaps, textual explanations or other form of explanations.

In step 1010, the neural network may aggregate the results for each partition. This is the predictive result for the activated partition. In mathematical terms, the aggregation function is defined by $A_j(\theta_j(X)T(X))$. In an exemplary trivial setting, the aggregation function may be a simple summation of the feature attributions. This becomes equivalent to a linear function, at least functioning in a local manner, such that the result $R_j = \theta_j(X)_1 T(X) + \ldots + \theta_j(X)_z T(X)$.

Finally, the switch layer 1020 may select the activated partition. If more than one partition is activated, some ranking function 1025 may need to be applied. The result is generated through the layer 1030.

In a practical embodiment, the INN model may have several optimizations in transformation functions $T(x)$, in the estimators $\theta_j(x)$, in the aggregation function A, in the ranking function R or within some other component. INNs provide a higher level of flexibility by enabling partitions to be customized according to the level of simplicity or complexity which is required.

Exemplary embodiments may present a number of global and local methods for detecting bias within a model. It may be contemplated that a given artificial intelligence (AI) or machine learning (ML) model has been induced such that it is in a generalized XAI format or some other compatible format such as an explainable neural network, or an explainable transducer transformer whereby knowledge is modelled in the form of rules with linear or non-linear equations or suitable logical equivalents.

The white-box nature of the XAI, XNN, XTT, XSN and XMN models enables bias detection to be applied with different levels of abstractions: (i) globally, by analyzing the rules themselves; or (ii) locally, by analyzing a specific sample. Each of the exemplary methods have their own advantages and disadvantages and may serve different purposes.

A major driver for bias is potential weakness in the data, which in many cases could be a result of selection bias or lack of data, although this could arise from other driving factors. This occurs when the dataset used for training is not representative of the environment where it will operate. For example, a security camera system may be trained to detect moving objects and recognize faces with data which has been collected during daytime only. Such dataset may be biased and may benefit from including daytime as well as night-time data. A global model bias analysis may detect this type of bias and may identify additional training data which may be collected to strengthen the resulting machine learning model.

Another major driver of bias is prejudice. This is typically unintentional bias which occurs due to the culture and environment where data is being collected. For example, a model may be biased towards a specific gender because the dataset is unbalanced with samples of a specific gender. An exemplary embodiment may detect this type of bias, and in some cases, may be able to correct or adjust the model using techniques such as human knowledge injection. XAI models such as XNNs may help in assessing such societal, cultural, environmental and role-induced sources of bias via a mixture of causal diagram modelling and parametrization of group models like a dedicated XAI model or a Bayesian network that attempts to model the effect of multiple labelers or human judges on the XAI model training itself.

Bias detection determines if a specific model or dataset is biased towards specific features. However, such features may depend on other features, which may result in a causal effect. In an exemplary embodiment within the travel industry, it may turn out that a specific model may be biased towards cabins which are in a specific location within the vessel. However, causal analysis may determine that such rooms allocated for First Class bookings, and such bookings may also indirectly infer that the booking is for someone with high-income. Causality may determine the source of the bias. An exemplary embodiment may incorporate causality and causal models together with XAI/XNN/XTT/XSN/XMN models or suitable logical equivalents, allowing for this type of sophisticated bias detection to be performed. Causal models may also be used in certain cases to correct or adjust for bias by creating what-if and what-if-not type of analyses and may also suggest suitable interventions. Causal models may also be used to detect the presence of bias using counterfactuals and may also determine how results from any of: (i.) one part of the model, (ii.) a related model, and/or (iii.) sub-part of the model, can be transferred or transposed directly or via the appropriate modification, conditioning, allowance or other appropriate transformation. Causal analysis may be used to enhance bias detection and mitigation with the application of mediation analysis, and subdivision of counterfactuals including direct and indirect effects of both interventional and counterfactual type of modifications.

In an exemplary embodiment, a bias treatment framework may be implemented as part of a bias detection and mitigation system for XAI. Such a bias treatment framework needs to enforce some notion of fairness and acceptability, for example, using a risk-assessment framework or an identification-assessment-action matrix. The bias treatment framework may attempt to address: (i.) procedural fairness, where the use of protected attributes in the decision process is prohibited or minimized to ensure equality of class treatments; (ii.) outcome fairness, where the equality of outcomes among protected groups is maximized; (iii.) impact discrimination, which is identified via impact analysis and assessment of the outcomes on members of the protected attribute or group, when such impact is determined to be an adverse impact, and which is then minimized or completely eliminated by the bias mitigation system. It is further contemplated that the bias treatment framework may produce a diagnosis and/or goal-action-plan that presents the results of the identification-assessment-action matrix together with possible recommended and ranked mitigation actions in an actionable format.

Another possible bias may be caused when the method of data collection adopted for building the training data systematically fails to represent the real data, known as measurement bias. For example, an image-based classifier may be trained on photos with a chromatic filter which would cause a bias by skewing the data in a particular direction. Such measurement and systemic biases may be adjusted by injecting human knowledge, by adding adjustment rules to the induced XAI model, by modifying the appropriate weights in XNN, XTT, XSN and XMN models, or by using a post-processing correction method in conjunction with these methods.

Bias may also be introduced through an algorithmic process which is applied in the machine learning algorithm or through some other algorithmic process that has been applied to the input data or the training dataset itself, known as algorithmic bias. For instance, a model may perfectly fit the training data, but may end up being highly sensitive to noise. The white-box nature of the induced XAI models and the XNN/XTT/XSN/XMN models allows for such scenarios to be detected and corrective action taken. This particular type of bias may be difficult to detect in black-box models.

A model may be defined as "fair" or to have fairness if its results are independent of some variables which are considered sensitive and not related with it (for example, gender, religion, sexual orientation, etc.). Bias detection tools may be used to determine the fairness of a model.

Bias detection may be detected by analysing the difference in feature attribution when applying a control swap. Control swap is a method whereby for a given transaction X, the potential data field which has a bias (for example gender), is modified to test any change in the outcome and explanation.

In an exemplary embodiment, a transaction X may contain a field F which has potential bias in the transaction X. Let g be the modified transaction such that the field F is modified with a swapped value. Continuing with the example, the field F may represent the gender field. X may represent the transaction for Male and X an identical transaction, but with the gender field swapped to Female. An XNN may accept a transaction and returns an answer and explanation pair. To test for any bias the XNN is called twice using multiple inputs, X and X. Any difference in the resulting explanation which may include feature attributions as well as the outcome, is used to detect any potential bias.

A global method of bias detection may be applied directly on the model, without the need to use any data for testing the bias. This may be possible via the linear or non-linear equations which are available in the rule-based model (XAI Model) or logically equivalent methods such as an XNN, XTT, XSN, XMN and other suitably equivalent implementation methods. In the linear or non-linear equation, lists of features may be extracted with their corresponding coefficients which may represent the feature importance for that given model or set of rules.

In a generalized format, for a dataset D which is a representative sample of some population P, let n and q represent the size of the dataset and population respectively. then it may be formalized that in general $n \leq q$. Additionally, let M represent the features of the dataset D, whereby the size of the vector $m=|M|$, that is the number of input dimensions (example x, y). Let R represent a vector with all possible features in the population P and let $r=|R|$. Let i represent the $i^{th}$ feature of dataset D such that $0 \leq i < m$. Furthermore, let s represent the $s^{th}$ feature of the population P, such that $0 \leq s < r$ and $m \leq r$. The dataset D also consists of z labels, whereby the labels may represent classification classes, classification probabilities or regression values. Finally, the trained model may be defined with the function F(X), where X is a vector with m input features.

The function F(X) may transform the input features m, into k transformed features through some intermediate transform function Transform(X) using polynomial transformations, Fourier transforms, one-hot encoding, etc. The structure of F(X) may be in the form of rules which may be extracted through some induction method or via an explainable model such as an XNN. For example, a typical embodiment of such rules may be in the form of If <Localization Trigger> then <Answer> and <Explanation>. The Localization Trigger is a conditional statement which covers a specific partition in the model/data. The Explanation may be defined as a linear or non-linear equation with a number of coefficients which are used for calculating the bias. The Answer may be calculated from the equation. In an exemplary embodiment, the following may be a ruleset extracted for the dataset D.

$$f(x, y) = \begin{cases} Sigmoid(\beta_0 + \beta_1 x + \beta_2 y + \beta_3 xy), & x \leq 10 \\ Sigmoid(\beta_4 + \beta_5 xy), & x > 10 \wedge x \leq 20 \\ Sigmoid(\beta_6 + \beta_7 x^2 + \beta_8 y^2), & x > 20 \wedge y \leq 15 \\ Sigmoid(\beta_9 + \beta_{10} y), & x > 20 \wedge y > 15 \end{cases}$$

Given some input data X, the explainable model F(X) generates an explanation $E = \{\theta_0, \ldots, \theta_i, \ldots, \theta_{k-1}\}$ and an answer A which may be derived using some answer/result function such that A=Answer(E). $\theta_i$ represents the importance of the $i^{th}$ transformed feature. In a trivial embodiment, the answer function may simply be a summation function. The vector E contains the feature attributions of the transformed features with respect to the input X. The vector E serves as a candidate explanation which may be used to justify the explanation, detect bias and to interpret the overall answer.

Finally, the model F(X) may be a white-box model which enables the weights of the model to be represented as a matrix of coefficients, whereby the coefficients are extracted from the different rules and the transformed feature weights. If the model is not white-box, it may still be able to generate the explanation vector E, but global explainability and global bias detection on the model directly may not be possible. Therefore, with a white-box model identified by F(X), let C represent a matrix of coefficients where j represents the total number of rules in the rule-based model and k the total number of features/coefficients. It may be noted that missing features may be represented with a zero-valued coefficient.

$$C = \begin{bmatrix} C_{0,0} & \cdots & C_{0,k-1} \\ \vdots & \ddots & \vdots \\ C_{j-1,0} & \cdots & C_{j-1,k-1} \end{bmatrix}$$

The coefficient matrix serves as the basis for generating explanations in either local or global manner, as well as to detect bias.

Bias detection may be applied in different manners, depending on the type of bias. Bias detection may be applied globally on a white-box model, or locally, given some input samples for testing the bias. In an alternative embodiment, the system may also aggregate local results to create a global view.

When implementing an interpretable model which allows inspection of rules or the inner workings/weights of the model, it is possible to extract any potential bias without the need for any input data. For instance, with global explainability, the coefficient matrix C may be analyzed directly in order to extract the most important feature per rule/partition in the model defined by F(X). In an alternative embodiment, the matrix of coefficients may be aggregated such that the vector I represents the aggregated importance of each feature from all j rules such that $I=\{\theta_0, \ldots, \theta_i, \ldots, \theta_{k-1}\}$ where $$\theta_i = \sum_{p=0}^{j-1} C_{p,i},$$

such that $C_{p,i}$ identifies the $i^{th}$ coefficient of the $p^{th}$ partition/rule.

Finally, let $I_s=\{F_0, \ldots, F_s, \ldots, F_{k-1}\}$ represent a sorted vector with all elements of I where s represents the sort index, such that $F_{s-1} \geq F_s \geq F_{s+1}$. A map vector M may also be used to link the sorted coefficient index s with the transformed feature index k. Through the white-box nature of the rule-based XAI model, a user may then be able to inspect for any potential bias by inspecting the contents of the sorted feature importance vector $F_s$ whereby $F_0$ and $M_0$ may contain the feature with the highest bias. A normalization may also be applied on the resulting feature importance.

In an exemplary embodiment, the F and M vectors may be used to create appropriate reports and analyses of bias and their sources, and may also be inputs to formulate a strategy for bias reduction, mitigation or elimination either via supervised, unsupervised or semi-supervised means.

In an alternative embodiment, the F and M vectors may be used as input to a feature discovery and model discovery method that utilizes this information in perfecting its strategy and/or as an additional input parameter that lets the feature discovery and model discovery method suggest, and optionally execute, structural changes to the AI model. For example, in an exemplary embodiment, the bias information may be used to focus a Genetic Algorithm (GA), Particle Swarm Optimization (PSO) or Monte Carlo Search Method (MCSM) system on specific parts of an XNN/XSN/XMN that exhibits bias, or rules in an XAI model that may be causing bias, or the attention model of an XTT that exhibits bias, or actions taken by an XRL agent that may be causing bias under some policy. Local bias detection may be applied to a specific sample. The answer, along with its explanation coefficients, serve as the basis for localized bias detection. It is further contemplated that in an exemplary embodiment, a Multiple Objective Optimization (MOO) system may utilize bias detection objectives to search for XAI models that minimize bias of an unacceptable type. Additionally, such an exemplary embodiment may form the basis of an AutoXAI system that incorporates bias detection, identification, assessment and mitigation as part of its optimization processes. It is further contemplated that the evolution of such a model, from a biased to an unbiased or less biased version, may be visualized as a graph of changes that have been applied to the model, or as an evolutionary graph that uses named labels for modules (nodes) and connections (edges) in the XAI model to explain how an unbiased model was obtained. Is is also further contemplated that a Pareto Front type of visualization and explanation may be used to explain the basis of the decisions taken by the AutoXAI or an appropriate Model Discovery and Optimization system in the creation of an unbiased model. In an exemplary embodiment that is used to generate symbolic expressions within a workflow system or even an artificial software and/or hardware development language, this model evolution change may represent a change in the workflow or relevant code snippet. It may be further envisaged that an exemplary model evolution explanation may be used to report and integrate such a change with appropriate change-management and audit systems. For example, in an audit system (used for illustrative purposes), the edit operator lists and the model evolution explanation may be saved in a system of record, distributed ledger technology (DLT), database, audit log, or some other suitable system, or transmitted externally (for example, they may be transmitted securely over a telecommunications network, to ensure that a tamper-proof and traceable change record is kept securely in a trustworthy manner).

In an exemplary embodiment, an XAI model may be implemented as part of an Explanation and Interpretation Generation System (EIGS) that utilizes the neuro-symbolic output of an XAI model in the creation of answers, explanations, justifications, and interpretations within a personalized goal-plan-action architecture. It is further contemplated that a sequence of Explanation and/or Interpretation predictions and/or a sequence of Explanation and/or Interpretation representations may be used by the EIGS to analyze the flow of the Explanation and/or Interpretation values and features over time. Such flow may be used by the bias detection system to detect new and hitherto unidentified sources of bias in the dataset(s) and/or the XAI model(s) themselves, allowing the new source of bias to be monitored and optionally acted upon.

Bias measurement and quantification can be performed in a compatible manner with other measurement functions in machine learning systems, allowing such measurement to be incorporated within other systems, such as MOO systems. Bias quantification can be of a statistical nature like statistical parity difference, demographic parity, group fairness, equal opportunity difference, predictive equality, equal odds, positive predictive parity, positive class balance, negative class balance, average odds performance, disparate impact, and the Theil index combined with those of a more causal nature like procedural fairness, individual fairness, outcome fairness, counterfactual fairness and impact outcome measures. It is further contemplated that the bias mitigation system may utilize measures and metrics based on Key Ethics Indicators (KEIs) to enable an assessment of an XAI model against the stated trustworthy and ethical objectives and the extent of compliance against such KEIs. KEIs can also be used to optimize and select XAI models that best reflects intended decision-maker value and prioritization of objectives, and tie-in with the concept of decision spaces, which is disclosed later on. KEIs may enables a practical implementation solution for the bias mitigation system to provide a justification of why a particular decision made by the XAI model is more (or less) successful in satisfying its pre-defined fitness-for-purpose than other available alternative options.

Referring to an exemplary model, a specific input sample may have two inputs, in this case x and y. A feature importance vector I may represent the feature importance in a global manner such that I=$\{\beta_1, \beta_2+\beta_{10}, \beta_3+\beta_5, \beta_7, \beta_8\}$, corresponding to the features $\{x, y, xy, x^2, y^2\}$. The vector I may be sorted in descending order such that the most prominent feature is placed in the beginning of the vector. Given a specific input vector $\{x, y\}$, it may be noted that one or more rules may trigger through the function $f(x, y)$. In this exemplary embodiment, let $x \leq 10$. This may trigger the function Sigmoid $(\beta_0+\beta_1 x+\beta_2 y+\beta_3 xy)$, which results into the following localized feature importance vector, which serves as an explanation candidate whereby E=$\{\beta_1 x, \beta_2 y, \beta_3 xy\}$. It may be noted that different features may have different importance at a global and a local level; for example, in this particular embodiment, globally the feature x may be the most important, however, after evaluating the function locally it may be noted that y is the most important.

In the case of polynomial features, simplification of the resulting feature importance may also be grouped according to the feature variable, independent of the polynomial degree. In the above exemplary ruleset, the coefficients $\{\beta_0, \ldots, \beta_{10}\}$ may represent the importance for each feature. The higher the value, the higher the importance. Such a method may be applicable when all input features (in this case x and y) have been normalized to some common scale. Common scaling methods may include min/max range scaling or z-score normalization (or standardization). The feature importance may be calculated per rule, as well as globally on the entire model.

When calculating the feature importance globally, the coefficients may need to be aggregated from multiple rules. For instance, in an exemplary model, the global aggregated feature importance vector I may be equal to $\{\beta_1, \beta_2+\beta_{10}, \beta_3+\beta_5, \beta_7, \beta_8\}$ where globally they represent the feature importance for the features $\{x, y, xy, x^2, y^2\}$. The vector I may be sorted in descending order into a vector $I_s$, such that the most important features are ranked first. Alternatively, feature summarization may be applied to simplify the bias detection interpretation. Referring to the exemplary model, the summarization technique may be applied such that the feature vector I may now contain grouped features for x, $x^2$ and y, $y^2$. The simplified feature importance may become $I_g=\{\beta_1+\beta_7, \beta_2+\beta_{10}+\beta_8, \beta_3+\beta_5\}$. The resulting features $\{x, y, xy\}$ are grouped together irrespective of the polynomial degree. Correlated variables such as xy may be used to analyze the feature importance and bias for linked variables. Finally, $I_g$ may be grouped in a similar manner to $I_s$.

Such a method may be suitable when a user has knowledge about the domain. The user may be able to inspect the coefficients of the model in order to determine if the high-valued coefficients represent a potential bias.

Bias in AI models occurs when the expected or actual reported values/answers from the model differ from the true underlying features or parameters being estimated or analyzed and can result from a number of major drivers leading to different types of bias. Bias may be in the model and/or the dataset itself. In some cases, bias may cause weakness in the data, although this is not applicable in all cases. The definitions below may apply to model and/or dataset bias interchangeably. Bias types can be classified in various ways, including but not limited to: (i.) selection bias, (ii.) spectrum bias, (iii.) omission bias, (iv.) analytical and detection bias, (v.) reporting and data availability bias, (vi.) systematic bias, and (vii.) behavior bias.

In (i.) selection bias, samples are not fully or properly representative of the underlying population. Formally, this happens when the size of the dataset n is too small when compared to the size of the population q. Alternatively, it may also be the case that the number of features m is not sufficient to represent the population P. One exemplary method is to plot the dataset size versus the model performance (e.g. accuracy) and determining the ideal dataset size n when it reaches a point that satisfies the minimum which reaches the desirable model performance.

In (ii.) spectrum bias, differences in different sampling groups affects the results, which is usually caused by (a.) different distribution of input dataset samples in the different classes being analyzed, affecting the sensitivity and specificity of the results, or via (b.) a change in prevalence and incidence, which may also be linked to the data collection methodology itself. Similar to the previous embodiment, the data parts are used to identify the different sampling groups. Formally, let G represent the different sampling groups whereby g identifies the $g^{th}$ group in G whereby each group may represent a different sampling group. Additionally, each group may consist of a number of samples identified by $D_g$ such that $D_g \subseteq D$. The dataset D may be defined as biased when explanations from multiple groups are inconsistent with respect to each other. Such bias may be identified by splitting the dataset into z groups according to different sampling groups. Specific criteria may also be applied, such that each group contains the same proportion of sample classes.

Alternatively, a random splitting method may also be used. In an alternative embodiment, a causal model such as a causal DAG may be used to stratify the dataset while ensuring that the presence of colliders, causal paths, and so on are catered for or adjusted for appropriately. For example, each group may be taken as a hold-out dataset, and the remaining data may be taken from the other groups for training the model. Then, the model may be fitted and evaluated. Finally, the stability of the model may be evaluated with the different groups. If the model exhibits drastic differences in a specific group, there is a sign of weakness in that group. Alternatively, the instability may also be detected using the resulting explanations. The inconsistency will be evident in the lack of stability of the feature attributions; hence it will expose the potential bias. In other words, a stable explanation should remain the same for similar inputs or group of data. One method to detect such bias is to analyze the effect on the output explanation on each group, that is, the vector $E=\{\theta_0, \ldots, \theta_i, \ldots, \theta_{k-1}\}$ whereby $\theta_i$ represents the importance of the $i^{th}$ transformed feature. Should the resulting explanation vector E exhibit drastic changes between similar data points, there is a sign of bias in the data.

In (iii.) omission bias, a feature or parameter that is statistically or causally significant has been omitted from the dataset itself. Formally, let a represent the missing feature. Then $a \notin M$ and $a \in R$. A significant feature should have direct impact on the model performance, that is, accuracy for classification or some relevant metric like mean squared error for regression. Possible embodiments that check for omission bias is via the integration of causal models, which may point to areas of weakness or mismatches between the causal chain connecting different input features in the dataset that point to omission in the dataset itself. This type of bias may be detected automatically, and typically may involve some form of semi-supervised iterative process.

In (iv.) analytical and detection bias, the dataset samples may have been chosen in a skewed manner, typically due to an error or mistaken assumption in the overlying causal model or selection process. Formally, let e represent the index of the erroneous feature, then the error is present in the $e^{th}$ feature of the dataset D. Such bias becomes present in the extracted coefficients $\{C_{0,e}, \ldots, C_{j-1,e}\}$, where j identifies the rule/partition index. When the scale of the features is skewed, it may also become present in the underlying coefficients of the XNN/XAI model.

In (v.) reporting and data availability bias, the dataset samples may present weakness in particular types of data samples, due to unavailability, difficulties in collection, expense or some other form of cause or combination of different causes. In an exemplary embodiment, this occurs when $W \not\subset D$ and $W \subset P$, such that W represents the weakness in the data, or the missing subset of data samples. Such bias may also be detected by dividing the dataset in z parts. Data parts may then be split randomly, via some stratification, sampling method, a clustering method, or a mixture of different methods. Random sampling may be done with or without replacement. For each part, a localized explanation is extracted via the function $f(X)$ which returns the explanation E. Let $P_E$ represent a set of explanations for a given data part in dataset D. Each element in $P_E$ consists of a vector of feature attributions $\{\theta_0, \ldots, \theta_i, \theta_{k-1}\}$ whereby $\theta_i$ represents the importance of the $i^{th}$ transformed feature. The resulting explanations for each data point are then combined through some aggregation function such that the aggregated explanation becomes $A_E=\text{Aggregate}(P_E)$. In an exemplary scenario, the aggregation function may be a simple summation. The result of the aggregation function may then be used to order and evaluate the important features which are impacting a specific data part, which will also help in identifying the potential bias. For complex networks such as CNN-XNN or AutoEncoders, the backmap method may also be used.

For each data part, the sensitivity of the features on the model performance may be analyzed such that the strongest feature in the explanation vector E or $A_E$ should have the largest contribution for the resulting model performance (for example, accuracy). In order to test the validity of the cluster, each feature is dropped in the order of importance, and recording the drop in model performance. A valid strong cluster should exhibit the property that the larger the importance, the stronger the effect that the model should have on the performance. Similarly, the smaller the importance, the lesser the effect on model performance. Finally, the model performance and the feature attributions are co-related in order to determine the strength/weakness of the cluster. With white-box models such as XNNs and XAI Models, it may be possible to update part of the model through the localized partitions, which may be updated and re-trained independently.

In an exemplary embodiment, a practical application of the present invention may classify strength and weakness within a framework that classifies data as (i.) fit-for-purpose (or not); (ii.) whether data samples are: (a.) already observed, or (b.) can be observed or synthetically generated. Table 1 below may then be used to assess and classify the data samples from a practical strength and weakness viewpoint. The classification may be used to guide the XAI system to prioritize certain types of data samples over others, or conversely, ignore certain data samples. The classification may be further used to create a diagnosis and/or a goal-action-plan that may aid in overcoming weaknesses and exploiting strengths to their full extent.

TABLE 1

Strength and Weakness Classification System

| Fit-For-Purpose | Observed | Observable or Generatable | Classification |
| --- | --- | --- | --- |
| Yes | Yes | Yes | Good Quality Data Samples |
| Yes | Yes | No | Irreplaceable Good Quality Data Samples |
| Yes | No | Yes | More of these Data Samples may be needed |
| Yes | No | No | Known Relevant Unknowns, may be used for Model Discovery and XAI System Improvement Planning |
| No | Yes | Yes | Irrelevant Data Samples |
| No | Yes | No | Irrelevant yet Irreplaceable Data Samples (candidates for Archival) |
| No | No | Yes | Irrelevant Data Samples |
| No | No | No | Known Irrelevant Unknowns or Out of Scope |

(vi.) Systematic bias may arise from systematic errors in the data collection or data measurement process itself that is distinguishable from random errors. Systematic bias can usually arise from: (a.) measurement errors due to calibration or equipment errors, or from systematic errors in the causal model itself, (b.) constant or proportional errors in comparison to the actual value of the measured quantity, (c.) drift that may occur over time or in a sequence of samples resulting in a distribution shift in the dataset that varies according to time or measurement/sampling sequence order rather than random shifts. This may occur when input dataset D consists of erroneous values. Let $D_e$ represent the $e^{th}$ sample of dataset D. Then $D_e+\alpha \in P$ such that a represents a vector of values with relative errors. Additionally, $\alpha$ may be the result of a function which calibrates the errors or shifts the data in a proportional manner and the like. Such bias may be detected by analyzing the feature importance globally through the coefficient matrix C. Alternatively, the feature attributions may also be analyzed by aggregating the explanation results. The backmap method may be utilized for complex networks such as CNN-XNN. Such bias may be the result of a good explanation but a wrong answer. In other words, the explanation vector E may have correct weights, at least in a proportional manner, but the result generated from vector E may be incorrect due to drifted, shifted or other systematic errors. In an exemplary embodiment, an XNN or XAI model may be used to identify causes of errors in an underlying causal model and/or dataset that has been observed or synthetically generated, and link this to different form of biases that are manifested as a direct or indirect result of such errors.

Finally, (vii.) behavior bias may refer to biases created by human emotional reasoning or mistakes processing information, which may inadvertently be duplicated by an AI system that is attempting to mimic past human decisions or reasoning, or that is attempting to form a model that is informed by these past human decisions or reasoning. In the field of finance, for example, "behavior bias" may be caused by trader overconfidence, where it has been found that overconfident traders trade much more frequently than is strictly warranted (even to the point where sold stocks outperform purchased stocks), creating an unwarranted bias toward taking action for the sake of taking action. Another "behavior bias" might be due to trader regret; a trader might continue to "throw good money after bad" on a poor investment decision—rather than cutting their losses—in order to avoid the regret of losing the original cost basis or losing gains. (This often makes traders biased toward selling winning positions too early and losing positions too late.) Another "behavior bias" might be due to human limitations, such as limited human attention span or a bias toward recent news headlines; human traders might make decisions which seem arbitrary in the broader context of a securities market because they are the most preferable trade out of a dozen options that have been considered rather than the most preferable trade for the market as a whole. Other "behavior biases" might include bandwagon effects (traders assume other traders know something they don't and follow trends because they are trends rather than due to underlying merits) or a bias toward "conventional" investment methods (traders may make decisions based on how easy it would be to justify their actions to management or to their clients).

Bias mitigation generally requires knowledge of how the measurement process is biased combined with some in-built notions or prior knowledge about the properties that the observed biased data would satisfy in an unbiased scenario. The framework presented in (Friedler et al., 2016) presents a formal definition of the disconnect existing between the observed space, consisting of the features that are observed in the dataset or are present in the set of feature interactions accessible to the XAI model, and the unobservable construct space, consisting of the features in the dataset or feature interactions that form the desired basis for the XAI model decision making process. Finally, a decision space models the actual decision making process taken by the XAI model. Within the (Friedler et al., 2016) framework, bias mitigation efforts try to mitigate the effects of the various possible bias mechanisms that drive discrepancies between these three spaces. The bias mitigation system conforms to the ideals in the Friedler framework by making any underlying assumptions about the mitigation mechanisms explicit, explainable and transparent. In our XAI models and their implementations, Friedler's formalization of the observed space and the unobservable construct space correspond to the XAI model input feature space (both raw and transformed) and the causal model and feature interaction analysis process respectively.

The bias mitigation system explanations thus provide explanations that include, but are not limited to, the following types of explanations: (i.) the assumptions being made by the XAI model about the construct space; (ii.) the constraints governing the mapping inferred by the XAI model between the construct space and the observed space; (iii.) limits and constraints about the continuity (and conversely, discontinuities) in the mapping inferred by the XAI model between the construct space and the observed space, and when are inverse, reversible functions available (and when not); (iv.) the assumptions being input by human experts about what is acceptable and what is fair (and conversely, what is not acceptable or fair); (v.) costs, impacts, risks associated with each acceptability and/or fairness criteria. During the bias mitigation process, the XAI model may reduce its prediction accuracy, while gaining a better outcome in the minimization of differences between the observable space and the unobservable construct space. In an exemplary embodiment, the causal models in the bias mitigation system and the XAI models may be used to offer a practical and pragmatic solution for the generation valid and justifiable inferences that map the observed space to the unobserved space that represents counter-factually "fair" worlds.

In an exemplary embodiment, an XAI model may utilize a bias mitigation system that utilizes so-called robust statistics, including, but not limited to, trimmed estimators, Winsorizing, M-estimators, L-estimators, and imputation, to minimize the bias problems associated with distribution shifts. Robust statistics attempt to achieve good statistical performance for data sampled from a wide range of probability distributions, especially when such distributions are not conforming to the normal distribution and are particularly useful for datasets that have the presence of outliers and reasonably small departures from parametric distributions.

Another form of bias may be introduced via type I errors (false-positive) and type II errors (false-negative) in statistics. A type I error occurs when a null hypothesis that is actually true in the population is rejected by the model, while a type II error occurs when a null hypothesis that is actually false in the population is not rejected by the model. Type I and type II errors cannot be completely avoided but the bias information provided by an exemplary embodiment can help identify when the dataset sample size is too small and may also identify areas where the samples can be improved to eliminate bias and also reduce the likelihood of both type I and type II errors, based on the premise that a larger and/or less biased sample leads to a smaller probability that the sample will differ substantially from the actual population. It is further contemplated that another type of Type I like error that can occur, especially with Deep Learning systems, relates to the introduction of incorrect relationships between input data patterns that are unrelated, which is also referred to as apophenia and is linked to false positives. In an exemplary embodiment using a combination of XNNs in conjunction with a causal model and/or mediation analysis, such errors may be identified by analysing the effects of such unrelated, spurious relationships and subsequently pruning out interactions, connections or weights from the XNN model to correct or mitigate such undesirable bias.

Referring now to exemplary FIG. 1, FIG. 1 may illustrate a high-level architecture of an exemplary convolutional XNN (CNN-XNN). An exemplary basic architecture of a CNN-XNN may combine a number of convolutional layers with a general XNN architecture. The CNN-XNN may begin with an input layer 102, which may receive input data, such as an input image, video, or historical record and the like.

Next, a convolutional network 104 may be implemented, which may feed data to the XNN 106.

The XNN 106 may receive the output of the convolutional layer 104 in an XNN input layer 108. The XNN input layer 108 may be input, possibly simultaneously, into both a conditional network 110 and a prediction network 120. The conditional network 110 may include a conditional layer 112, an aggregation layer 114, and a switch output layer (which outputs the conditional values) 116. The prediction network 120 may include a feature generation and transformation 122, a fit layer 124, and a prediction output layer (value output) 126. The layers may be analyzed by the selection and ranking layer 128 that may multiply the switch output by the value output, producing a ranked or scored output 130. The explanations and answers may be concurrently calculated by the XNN by the conditional network and the prediction network. The selection and ranking layer 128 may ensure that the answers and explanations are correctly matched, ranked and scored appropriately before being sent to the output layer 132.

Figure 2:
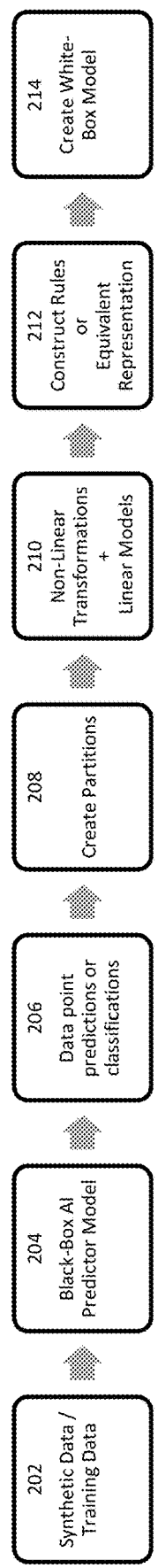
FIG. 2 is an exemplary embodiment of a schematic flowchart illustrating an exemplary XAI model induction method.

Referring now to exemplary FIG. 2, FIG. 2 may illustrate an exemplary method for extracting rules for an explainable white-box model of a machine learning algorithm from a black-box machine learning algorithm. Since a black-box machine learning algorithm cannot describe or explain its rules, it may be useful to extract those rules such that they may be implemented in a white-box explainable AI or neural network. In an exemplary first step, synthetic or training data may be created or obtained 202. Perturbated variations of the set of data may also be created so that a larger dataset may be obtained without increasing the need for additional data, thus saving resources. The data may then be loaded into the black-box system as an input 204. The black-box system may be a machine learning algorithm of any underlying architecture. In an exemplary embodiment, the machine learning algorithm may be a deep neural network (DNN). The black-box system may additionally contain non-linear modelled data. The underlying architecture and structure of the black box algorithm may not be important since it does not need to be analyzed directly. Instead, the training data may be loaded as input 204, and the output can be recorded as data point predictions or classifications 206. Since a large amount of broad data is loaded as input, the output data point predictions or classifications may provide a global view of the black box algorithm.

Still referring to exemplary FIG. 2, the method may continue by aggregating the data point predictions or classifications into hierarchal partitions 208. Rule conditions may be obtained from the hierarchal partitions. An external function defined by Partition(X) may identify the partitions. Partition(X) may be a function configured to partition similar data and may be used to create rules. The partitioning function may consist of a clustering algorithm such as k-means, entropy or a mutual information (MI) based method.

The hierarchical partitions may organize the output data points in a variety of ways. In an exemplary embodiment, the data points may be aggregated such that each partition represents a rule or a set of rules. The hierarchical partitions may then be modeled using mathematical transformations and linear models. Although any transformation may be used, an exemplary embodiment may apply a polynomial expansion. Further, a linear fit model may be applied to the partitions 210. Additional functions and transformations may be applied prior to the linear fit depending on the application of the black box model, such as the softmax or sigmoid function. Other activation functions may also be applicable. The calculated linear models obtained from the partitions may be used to construct rules or some other logically equivalent representation 212. Finally, the rules may be stored in an exemplary rule-based format. Storing the rules as such may allow the extracted model to be applied to any known programming language and may be applied to any computational device. Finally, the rules may be applied to the white box model 214. The white box model may store the rules of the black box model, allowing it to mimic the function of the black box model while simultaneously providing explanations that the black box model may not have provided. Further, the extracted white-box model may parallel the original black box model in performance, efficiency, and accuracy.

FIG. 3A depicts an exemplary architecture of a CNN-XNN applied to medical imagery. In FIG. 3A, a forward pass is depicted. The forward pass may begin with an input 302, which in this exemplary case is an image of an X-Ray scan. Next, the input may go through the CNN layers 304. The input 302 may then be convoluted 304, where different elements of the input are extracted and categorized. Next, the convoluted layers are pooled or grouped based on similar features 306. The pooled features could be again convoluted and pooled. In this exemplary embodiment, the CNN layer performs the convolution 304 twice and the pooling 306 twice, however it may be contemplated that additional repetitions of these layers may be implemented, depending on the application. After the CNN layers convolute and pool the features, the features may be flattened for input into the next system. The flattened features may be presented to the next system 305 in the form of a list of concepts 310. In this exemplary embodiment, the next system 305 is an XNN 312. The XNN may then process the flattened list of concepts and then produce a corresponding output 314.

Referring now to exemplary FIG. 3B, FIG. 3B may illustrate an exemplary reverse indexing mechanism. One of the unique features of CNN-XNNs is that, once a CNN-XNN is trained, it may process a backmap, as shown in FIG. 3B. The reverse indexing mechanism (backmap) is something unique to the XNN/XTT/XSN/XMN/XRL/XAI model architectures due to their white-box nature. The reverse indexing mechanism is not limited to CNN-XNN architectures only but may also be applied to other architectures, including but not limited to, Explainable Auto-Encoders/Decoders (XAEDs), Text-Based XTTs (T-XTTs), and so on. In the specific case of XRL architectures, backmap corresponds to a backtrace map of all the agent actions taken in a particular episode or sequence of episodes with an explanation of why those actions were taken or are being proposed to be taken. The concept behind the backmap algorithm stays the same in all methods and architectures. The back map may be processed as an external process or as a neural network which performs the inverse function. The reverse indexing process illustrated in FIG. 3B may implement steps which are the same as or similar to the steps in the forward pass indexing process illustrated in FIG. 3A. However, in such a case, the operation may instead be performed backwards, beginning with the output and ending with the features of the input. Further, the pooling function may up-sample the data as opposed to the pooling in the forward pass which down samples the data. Similarly, convolution layers are worked out as a deconvolution operation. By performing a backmap, the output can be traced back to identify which concepts and features of the input ultimately led to the resulting output.

The neural network may be embedded within the CNN-XNN or kept as a separate network specifically designed for performing the inverse indexing mechanism. The process may start by identifying feature importance, as determined by the coefficients of the XNN network, and moves back, step by step, in reverse. The output weights may be mapped back to the original inputs. The inverse mapping may be applied until it reaches the original input, which may enable the conceptual feature importance to be mapped back to the original input. The reverse indexing mechanism may be useful for generating explanations either in the form of heatmaps or in some form which considers the actual convoluted filters when generating explanations.

The heatmap created by the backmap may facilitate bias detection. By highlighting the important areas within a specific sample (or picture), a user may identify if there is potential bias in the resulting explanation/model. Similarly, the backmap may also be used to identify which kernels are important at each layer of the CNN-XNN.

In an alternative embodiment, it may be noted that bias detection may also be achieved in an automated manner by aggregating the results from explanations. Referring to the previously described medical X-ray example, a heatmap may be used to detect a specific disease. In order to create a global view of the model, one way to determine the most important regions (hence bias), across the entire model, is to pass the entire training/test dataset via the backmap and create multiple heatmaps. By superimposing multiple heatmaps and averaging the heatmaps, any potential bias which may exist in a specific region within the image may be identified. The aggregation process may need to be applied separately on each class of data.

Another possible embodiment may aggregate the kernel importance for the entire CNN-XNN model in order to detect bias. For instance, it may be noted that a specific kernel which detects the pattern for blood is more important than another kernel which detects the pattern for the spine shape. Such kernel importance serves as the basis for detecting bias at a kernel level. In a similar approach, the kernel importance may be calculated across multiple samples (i.e. images), in order to create a global view of the kernel importance. Training/test data may be used to test for such bias. The aggregation of the kernel importance may also be calculated per class since certain kernels may activate more for one class, and less for another.

Bias may be present in multi-dimensional datasets like image datasets and possibly 3D scans. Issues with AI systems that process such data, for example, cropping and summarization systems may present problematic issues like gender or racial bias. In general, the vast majority of multi-dimensional dataset bias largely arises out of three main root-cause bias categories: (i.) capture bias, related to the data acquisition sensor(s) and environment(s); (ii.) category or label bias, arising from the difficulty of assigning clearly-defined semantic and/or semiotic categories to multi-dimensional data (for example, similar objects may be labelled with different labels depending on the labeler or due to in-class variability, the same label may be assigned to different objects); (iii.) negative category bias due to the distinct set of categories represented in a dataset collection. The size of the training multi-dimensional datasets used to build the AI model can also make the bias problem worse and lead to false conclusions being inferred by the machine learning process. XAI based bias identification and mitigation systems can use the white-box methods available for better dataset generalization to new, previously unseen training samples, even under data distribution shifts, where the training and test collections are sampled from different distributions. Neuro-symbolic architectures like XNNs may help address domain shift and distribution shift problems by leveraging symbolic knowledge to generalize their learning using logical inference, induction and deduction based methods.

Application domains are generally characterized by having datasets that have similar marginal and conditional distributions with respect to assigned category labels, where the categories are generally similar or shared across datasets. Neuro-symbolic architectures like XNNs may help address bias across multiple datasets and across entire application domains by utilizing symbolic methods to generalize better while simultaneously providing more transparent inspection and identification capabilities that allow both humans and automated systems to correctly identify bias sources and assess them as unacceptable or otherwise. Within an application domain, the sample selection bias, also known as the co-variate shift, is due to a marginal distribution difference between two or more datasets. The co-variate shift generally corresponds to the commonly accepted notion of capture bias. In this invention we provide two main ways of addressing capture bias: via strength and weakness detection and subsequent strength/weakness classification of parts of the dataset itself, and via mediation analysis and causal analysis leading to bias identification and mitigation.

Within an application domain having two or more datasets containing observations from the category set, bias may remain due to the chosen representation itself. Such representation bias may be identified by analysing the dataset-specific exogenous factors and then using feature encoding that represents the category information without introducing additional confounding elements. The kernel labelling, symbol and concept hierarchies in the XAI models and related implementations such as XNNs are robust against this type of representation bias.

Another source of bias may arise from class imbalance within the dataset(s). Imbalanced classification arises when a machine learning system tries to predict a category class label when the number of examples in the training dataset for each class label is not balanced. In such datasets, the category class distribution is biased (or skewed) rather than exhibiting the ideal case of being equal (or close to equal). Class imbalance is related to category bias and negative bias, as it causes a difference among the conditional distributions of two or more domains. Typically, when class imbalance arises, classes are classified as forming either part of a majority class or a minority class. The hierarchical partition structure in XAI models and XNNs may be used to assess the impacts of different areas of XAI model upon the various minority or majority classes. When bias or weakness affects a minority class negatively (this could also apply to a majority class, but less likely in practice), XAI models and XNNs may be able to improve the performance of the impacted class in a modular manner by refining only specific partitions within the partition structure. Neuro-symbolic XAI models enable transparent identification of the importance assigned to each feature and/or feature interaction during training, enabling the bias identification system to identify any potential bias being learnt in the minority class and the majority class, in real time. XAI models may also enable the creation of explanation path-traces for each of the input features in the underlying datasets, further assisting in the identification of potential bias being learnt in the minority and majority classes, in real-time.

It is further contemplated that XAEDs may be used to train XAI models and XNNs on the majority class only. An analysis of XAED reconstruction errors may be used to detect anomalies that may be subsequently used to determine the minority class followed by a bias mitigation step. It is contemplated that a high level of correlation between minority classes and XAED derived anomalies exists in general.

Bias mitigation for class imbalance may end up making the resulting XAI model more vulnerable to adversarial attacks, also referred to as adversarial bias, especially from data poisoning attacks. Prediction accuracy may exhibit an inverse relationship with fairness metrics in practical implementations. When the bias mitigation system imposes fairness constraints on the XAI models in a way that attempts to force the model to equalize its behavior across different classes, regardless of them being a majority or minority class, may indeed counteract the effect of bias in training data successfully, yet create a new form of conflict with the overall robustness of the XAI model. Global and local model checks may offer a practical solution to counteract, or at least detect, such loss in robustness in XAI models, which may be an indication of a targeted attack to prevent a fair and robust model to be created. Once the XAI model areas contributing to the lower levels of robustness are identified precisely, these can be modified to compensate and possibly correct inherent flaws, allowing the XAI model to recover back its robustness, or even exceed the robustness of the original biased XAI model.

It may also be noted that low-level layers of the CNN-XNN may only detect basic shapes such as corners, edges or straight lines. For this reason, kernel importance may need to be restricted to specific layers at higher levels only. The hierarchical breakdown of kernel features, symbols and concepts created by CNN-XNNs allow bias detection methods to utilize this extracted knowledge to improve accuracy further. For example, some symbols can be associated with a particular type of bias or can be used to flag bias or act as weights in some bias detection score.

In mathematical form, D may represent some dataset which will be used for validating the bias. The dataset D may have n data points of m dimensions. Then, ƒ(X) may be some function based on a rule-based XAI model, which can take the input data point X and returns a result along with an explanation as an equation. The resulting equation may also contain additional non-linear features and interactions, such as polynomial expansions. The transformed feature set may be denoted by $\bar{X}$ such that $|\bar{X}|=k$. The explanation may consist of an equation whereby $$y = \sum_{i=0}^{k-1} \beta_i \bar{X}_i$$

such that y represents the final answer for a given input and $\beta_i$ represents the coefficient or feature importance for the input X. The importance vector may be denoted by $I=\{\beta_0 \bar{X}_0, \ldots, \beta_{k-1} \bar{X}_{k-1}\}$. Finally, the importance vector for each data point may be sorted and aggregated such that importance rank of each feature is counted for each data point, where $R_{j,i}$ contains the rank of the transformed feature for the $j^{th}$ data point.

$$R = \begin{bmatrix} R_{0,0} & \cdots & R_{0,k-1} \\ \vdots & R_{j,i} & \vdots \\ R_{n-1,0} & \cdots & R_{n-1,k-1} \end{bmatrix}$$

Finally, some function Aggregate may take the R matrix and apply some aggregation function. In a simple scenario, the summation aggregation may be used to calculate the aggregated rank for each feature. For example, Aggregate $(R)=\{\theta_0, \ldots, \theta_i, \ldots, \theta_{k-1}\}$. The aggregation vector may be used to determine if certain features are more prominent than others. Gaussian distribution may be used to extract the outliers, which may represent potential bias in the data.

In a practical environment, a model may be monitored for any possible bias over the course of time. This enables the creators or users of the model to detect any shifts in the data which may occur due to unintentional bias which may be introduced over time. In an exemplary embodiment, the monitoring may be used for the following purposes: (i) self-certification and verification of bias (and lack thereof) in a system over time; (ii) flagging instances of potential bias and their associated risk score; and/or (iii) flagging and detecting input instances that are too far away from the training data distribution.

In particular, usage (iii) may be useful for deep learning-based systems that may suffer from significant performance problems when faced with new types of input instances, also known as input data distribution shift.

In an exemplary image recognition application, a binary classifier may differentiate between an image of a Husky and an image of a wolf. In an experiment done by the University of Washington, a black-box binary classifier achieved 90% accuracy. After analyzing the individual predictions, it became evident that the classifier was biased towards detecting snow. Rather than differentiating between wolves and huskies, the result focused on the presence or absence of snow so as to determine the output. Thus, the model accuracy alone may be a misleading metric and may not be suitable for measuring accuracy in mission critical business applications such as medical diagnosis, autonomous actions in driverless vehicles, or unmanned aerial vehicles (UAV). Having the explanation underlying the answer available together with the answer allows humans (and possibly other sophisticated automated systems) to detect such unintentional errors much faster than with black-box models that do not give an explanation.

In another exemplary application, the University of Pittsburgh conducted a study aimed at predicting the risk of complications in pneumonia patients. The goal was to determine the high-risk and low-risk patients in order to determine if such patient should be sent home (in the low risk cases) or admitted to the hospital (if it was determined to be a high-risk case). The system was designed with AI using a neural network architecture which analyzed more than 750,000 patients. The resulting model achieved 96% precision. When the system was tested with real patients, the doctors noticed a serious issue. The resulting model was biased towards people with asthma, meaning that people with pneumonia who also suffered from asthma were being classified as low risk. Such people actually have higher risk, and doctors typically treat them under intensive care in order to promote more effective recovery. The bias may be the result of weakness in the data which was not sufficient for modelling such cases.

Such a model implemented, for example, using an XNN may be corrected by adding an appropriate rule which is then incorporated in the XNN using a human knowledge injection method, or via alternative bias correction and mitigation methods such as human assisted partition focusing or selective editing of the XNN. Bias detection is necessary to eliminate unintentional outcomes which may be caused through bias, especially in domains where the model decisions and answers may have a disproportionate impact and/or outcome, like in the medical domain.

In an exemplary embodiment bias mitigation may be applied by pruning or modifying nodes and connections within the XNN. This may be possible since every node and connection has a well-define function and purpose. Once the XNN structure is modified, bias mitigation may work by either using the XNN as is (without re-training), alternatively, the XNN may also be refined by applying a few training epochs to adjust the internal weights. The dataset used for re-weighting the XNN network may remain untouched, however, perturbation or control swap methods may be used for balancing the dataset. For example, a model which is biased on a specific field, such as gender, may be modified such that it contains equal number of data rows for both males and females with the same output target label for each data pair (male/female pair). This method may also be extended for data fields which contain more than two values.

In an exemplary embodiment, an XAI or XNN model may be able to detect and explain abnormal patterns of data packets within a telecoms network and take appropriate action, such as allowing a user to remain connected, discard part of the data packets or modifying the routing priority of the network to enable faster or slower transmission. An XAI system may be able to model the data with high performance accuracy, however it may result in unintentional bias caused due to weakness in the data or improper modelling.

An exemplary white-box model may explain why it concluded that a specific action is required, while a black-box would simply recommend the action without any explanation. It may be useful for both the telecoms operator and the customer to understand why the model came to a conclusion. A white-box model may illustrate or explain which conditions and features led to the result. Both parties may have different goals and may be assisted by different explanations. From one side, the telecoms operator may be interested in minimizing security risk and maximizing network utilization, whereas the customer may be interested in uptime and reliability.

In one case, a customer may be disconnected on the basis that the current data access pattern is suspicious, and the customer must close off or remove the application generating such suspicious data patterns before being allowed to reconnect. This explanation helps the customer understand how to rectify their setup to comply for the telecom operator service and helps the telecom operator from losing the customer outright, while still minimizing the risk. The telecom operator may also benefit from this explanation. The operator may observe that the customer was rejected because of repeated breaches caused by a specific application, which may indicate that there is a high likelihood that the customer may represent an unacceptable security risk within the current parameters of the security policy applied. Further, a third party may also benefit from the explanation: the creator of the telecom security model. The creator of the model may observe that the model is biased such that it over-prioritizes the device operating system variable over other, more important variables, and may alter the model to account for the bias.

The system may take into account a variety of factors. For example, these factors may include a number of connections in the last hour, bandwidth consumed for both upload and download, connection speed, connect and re-connect count, access point information, access point statistics, operating system information, device information, location information, number of concurrent applications, application usage information, access patterns in the last day, week or month, billing information, and so forth. The factors may each weigh differently, according to the telecom network model.

The resulting answer may detect abnormality and may decide whether a specific connection should be approved or denied. In this case an equation indicating the probability of connection approval is returned to the user. The coefficients of the equation determine which features impact the probability.

A partition is a cluster that groups data points optionally according to some rule and/or distance similarity function. Each partition may represent a concept, or a distinctive category of data. Partitions that are represented by exactly one rule have a linear model which outputs the value of the prediction or classification. Since the model is modelled linearly, the coefficients of the linear model can be used to score the features by their importance. The underlying features may represent a combination of linear and non-linear fits as the rule format handles both linear and non-linear equations.

For example, the following are partitions which may be defined in the telecom network model example:

IF Upload_Bandwidth>10000 AND Reconnect_Count<=3000 AND Operating_System="Windows" THEN Connection_Approval= . . .

IF Upload_Bandwidth>10000 AND Reconnect_Count>3000 THEN Connection_Approval= . . .

IF Bandwidth_In_The_Last_10_Minutes>=500000 THEN Connection_Approval= . . .

IF Device_Status="Idle" AND Concurrent_Applications<10 THEN Connection_Approval= . . . Etc The following is an example of the linear model which is used to predict the Approval probability.

Connection_Approval=Sigmoid($\theta_1+\theta_2$Upload_Bandwidth+ $\theta_3$ Reconnect_Count+$\theta_4$Concurrent_Applications+ . . . ).

The coefficients $\theta_i$ represent the importance of each feature in determining the final output, where i represents the feature index. The Sigmoid function is being used in this example because it is a binary classification scenario. Another rule may incorporate non-linear transformations such as polynomial expansion, for example $\theta_i$Concurrent_Applications$^2$ may be one of the features in the rule equation. Other feature transformers, such as Fourier transforms, may also be used. Rotational invariance can also be optionally achieved by adding the appropriate rotational transforms to the coefficients, depending on whether this is desirable in the resulting explanation.

The partitions can also be merged at increasingly higher levels using a bottom-up or top-down approach if there is a continuous match, within appropriate error tolerances, of the boundaries modelled in each partition with those of another partition. In such a case, partitions may be merged together to simplify the resulting explanations, or alternatively the link between partitions stored in an association list (or other suitable data structure), and then used to structure the eventual resulting explanation in a more logical, practical and efficient manner.

Following the initial creation of an XAI model, it may be noted that the first rule in the model may be biased towards a specific operating system (e.g., MICROSOFT WINDOWS). In an exemplary embodiment, such bias may be undesirable and may need to be removed. Human knowledge may be injected to adjust the relevant partition such that the condition or trigger which causes the bias towards the operating system is removed. The globality and transparency of XNN and XAI models allow a human user to identify any potential bias towards a specific feature, or group of features. Bias may be in the training data or in the model itself. Human knowledge injection may be applied to enforce specific rules.

For example, human rules may be applied in order to ensure fairness through gender equality in a hiring system, ensuring that country-specific or jurisdiction-specific legislation is complied with. Bias may be detected through the coefficients of the rules or by aggregating the feature attribution of specific explanations. In general, the higher the coefficient absolute values or feature attribution, the more important the feature is. In an exemplary embodiment, bias may also be detected via the partition conditions. For example, a specific partition may have a condition that applies only to "females", thus flagging up potential gender bias in the AI system.

In another exemplary scenario, a user may be aware of traffic coming from a specific location which needs special attention; however, the rule to cater for this segment might be unknown. In this case, the user can define a new partition, and through assisted focusing, a local model may be learnt automatically. The XAI Model and XNN may be updated accordingly through the necessary conversions.

In an exemplary embodiment, bias may be reported. Any reporting format may be implemented. The following examples may represent different embodiments of reporting formats, all though a number of alternate possible formats not explicitly described herein may be contemplated. Additionally, more than one reporting format may be implemented in a system. Any combination of reporting formats may be contemplated.

Bias may be reported in the form of a feature importance graph or feature attribution graph highlighting the prominent features which are causing the unintentional bias. Error bars may also be used for demonstrating the impact on the model. This form of bias reporting may apply to all forms of datasets. In the case of tabular data, the feature importance graph may report which named features are causing the bias. For example, it may rank the features by name, such as gender, age, location, etc. Percentages may be used to illustrate the importance of the feature on the result prediction or classification. Absolute values may also be used to illustrate the impact in absolute terms. Textual, visual, graph, diagrammatic, audiovisual explanations and other mediums may be used for reporting bias. Bias may also be linked and reported to a root cause analysis (RCA) diagram, including common reporting formats such as fishbone diagrams, Feynman diagrams, and so on.

Bias error bars and bias error tolerance levels may be used in a reporting, introspective modality, or can additionally be actively used to influence the machine learning process directly. In an exemplary embodiment, the initial bias levels may be initially found by analyzing the explanation coefficients and the links discovered by the XAI model induction process. A bias tolerance level or some other kind of bias target may be specified by the user. In an exemplary embodiment, the bias tolerance levels may be provided in the form of constraints on the maximum bias value that is acceptable before an alert is issued or the model is flagged for review and possibly retraining. Tolerance constraints may also be applied on the rate of change of bias values, for example, to detect a sudden increase in bias on a particular feature, and also the overall volatility of the bias value to detect stability issues with the model itself.

Some appropriate bias tolerance optimization methods such as gradient descent methods, numerical simulation and optimization methods, genetic algorithms, Monte Carlo Simulations, Game Theory and other methods may then be used to find different correction factors and/or suggest changes to the model to meet those pre-specified target bias tolerance levels. In an exemplary embodiment, a suitable optimization method may be used to retrain the model weights and/or add new links and structure in the model to reduce the total amount of bias in order to meet the bias tolerance parameters. Another alternative exemplary embodiment may utilize the structure and capabilities of the model itself, for example, when dealing with XAI models, so that constraint satisfaction techniques can also be used to ensure that the bias tolerance parameters are satisfied. In an exemplary XNN, a possible embodiment may use gradient descent methods and model discovery methods to change the structure of the XNN to change its bias. In an exemplary XTT transformer, the attention weights of the transformer may be modified to change the transformer bias. In an exemplary XTT transducer, the output weights may be changed in a similar manner to an XNN to change the transducer bias. In an exemplary XAI model, the rule weights may be changed to change the bias, and new rules may also be introduced. In another case of an exemplary XAI model, some of the new rules may have expressive computational power that goes beyond that achievable by Deep Learning and related methods, in which case a distributed XAI/XNN/XTT/XSN/XMN ensemble can be utilized to execute the resulting bias corrected model.

An exemplary embodiment using distributed XAI/XNN/XTT/XSN/XMN models can be used to detect bias in particular modules and sub-components of the distributed system itself. FIG. 8 shows an exemplary distributed system. A distributed XNN/XTT/XAI architecture may incorporate multiple independent models where one such model, once trained, can work independently without the need to rely on the full distributed architecture, which is optimized primarily for training purposes. An exemplary architecture may be extremely useful for large datasets where the training data cannot fit in the CPU/GPU memory of a single machine. The component XNN/XTT/XAI models can be standard plain XNNs/XTTs or any XNN/XTT/XAI variants such as convolutional XNNs (CNN-XNNs), predictive XNNs (PR-XNNs), Text XTTs (T-XTTs) and the like. The component models may also be composed of Interpretable Neural Networks (INNs), which are a generalization of XNNs and XTTs that utilize a black-box predictor together with an XNN-like white-box layer, hence the term grey-box, which consists of a hybrid model that has an uninterpretable part (the black-box) wrapped in an interpretable interface (the white-box portion) and that outputs an interpretable output. It may be contemplated that the white-box portion of grey-box systems, such as INNs, may be interchangeable for XNNs and XTTs in this invention.

An exemplary embodiment may implement a hybrid deployment where one or more components of the distributed architecture consists of an entire or sub-part of an XAI model (obtained via a suitable method, such as an XAI model induction method) and/or an entire or sub-part of an explainable transducer transformer (XTT) and/or an entire or sub-part of an explainable neural network (XNN). An exemplary embodiment may also include action triggers within XNNs/XTTs/XAI models to achieve higher performance, real-time, and quasi-real-time reactions and operations in the XNN/XTT feed-forward operational mode and the non-training operational mode of XAI models.

Bias correction and detection can be applied on each sub-component and variances in a particular component used to either eliminate or minimize or otherwise adjust the results from that particular component, or even be utilized to detect areas of bias, strengths and weaknesses in the resulting ensemble system. It is also further contemplated that distributed systems can utilize Associative Neural Networks (ASNN) to further improve the prediction and estimate of bias of the distributed system both for bias detection and bias correction, while also enabling the ASNN to provide a reasonable approximation of the characteristics of new types data when encountered, without the need to retrain the entire distributed ensemble. It is also further contemplated that the predictive approximation provided by ASNNs can also be implemented using other embodiments such as Predictive XNNs (PR-XNNs), Predictive XTTs (PR-XTTs), Predictive INNs (PR-INNs) and other suitable methods.

Referring to FIG. 8, FIG. 8 illustrates a disjoint stratification of the input data, thus forming a permutation and grouping of the input dataset 2000 into n parts. However, an overlapping choice of partitions, where one or more items from the input data may be repeated in the resulting n partitions, is also possible and useful in certain applications where the dataset is split across multiple servers, or in a loosely connected distributed system or some other form of distribution or federation of data. The resulting distributed system resulting from overlapping n data sets may magnify or emphasize certain parts of the input dataset, although this may be counteracted by the appropriate use of weighted aggregation functions. Additionally, XAI and XNN may allow for the implementation of bias detection and strength and weakness detection used in conjunction to identify any distortions introduced in the resulting distributed architecture system as a result of the stratification method.

Once the data is split into n parts, an XNN model may be trained in parallel for each n data parts, such that the $i^{th}$ data part creates the $i^{th}$ XNN model 2010.

$$f_i(x, y) = \begin{cases} \text{Sigmoid}(\beta_{i,0} + \beta_{i,1}x + \beta_{i,2}y + \beta_{i,3}xy), & x \leq 10 \\ \text{Sigmoid}(\beta_{i,4} + \beta_{i,5}xy), & x > 10 \land x \leq 20 \\ \text{Sigmoid}(\beta_{i,6} + \beta_{i,7}x^2 + \beta_{i,8}y^2), & x > 20 \land y \leq 15 \\ \text{Sigmoid}(\beta_{i,9} + \beta_{i,10}y), & x > 20 \land y > 15 \end{cases}$$

The final XNN model 2020 may be created by combining the n XNNs 2010 together. The aggregated model 2020 identified by $f_a(x,y)$ may be calculated by applying a combination of the n functions via an appropriate combination function. For example, the mathematical average may be used as a straightforward combination function.

$$f_a(x, y) = \begin{cases} \text{Sigmoid}(\theta_0 + \theta_1 x + \theta_2 y + \theta_3 xy), & x \leq 10 \\ \text{Sigmoid}(\theta_4 + \theta_5 xy), & x > 10 \land x \leq 20 \\ \text{Sigmoid}(\theta_6 + \theta_7 x^2 + \theta_8 y^2), & x > 20 \land y \leq 15 \\ \text{Sigmoid}(\theta_9 + \theta_{10} y), & x > 20 \land y > 15 \end{cases}$$

The coefficients are represented by $\theta_j$ such that $j \in \{0 \ldots k-1\}$ where j identifies the $j^{th}$ coefficient and k is the total number of coefficients. In the exemplary embodiment, k=11. Therefore, the average may be calculated as:

$$\theta_j = \frac{\sum_{i=1}^{n} \beta_{i,j}}{n}.$$

In an alternate embodiment, the aggregate model 2020 may also be composed of a weighted average, where $w_j$ represents the set of weights and:

$$\theta_i = \sum_{i=1}^{n} \beta_{i,j} w_j$$

Such that:

$$\sum_{j=0}^{k-1} w_j = 1$$

The weights $w_j$ may be determined in several ways. One method to determine the value of $w_j$ is through strength and weakness detection in the dataset. The strength/weakness in each data part may be determined by evaluating the accuracy, precision, mean squared error, or some other metric. Further, a combination of multiple metrics may determine the weights.

The weights $w_j$ may be calculated such that the data parts with the highest strength get larger weights, whereas, parts with weaker data get a lower weight, such that the total sum of all weights should always be equal to 1 in order to obtain an aggregated model with a weighted average.

An exemplary embodiment may thus be used as part of an optimization pipeline that allows for unsupervised or semi-supervised (or even fully supervised) changes in bias to fit within an appropriate bias risk and tolerance specification and/or targets. In unsupervised modality, such a system may utilize an exemplary embodiment in some appropriate dynamic or iterative fashion to optimize the model until it meets or exceeds such desired bias tolerance levels. In semi-supervised (or fully supervised) modality, the system may include input from humans to take the right decisions at appropriate steps and may optionally utilize the human knowledge injection capabilities of white-box models to speed up the process or go beyond the limitations of whatever bias tolerance optimization method is utilized.

In another exemplary embodiment, a heatmap may be generated by the system, highlighting the hot regions which influence the resulting classifications. A classification made for the wrong reasons may be evident with the heatmap. For instance, in the previously described example where the system is differentiating between a Husky and a wolf, hot regions marked on the snow may indicate that there is bias in the data/model, such that the snow has a large impact on the conclusion (as opposed to the features of the canine).

Referring now to FIG. 4A, FIG. 4A shows an exemplary output from each step in the generation of a backmap. The heatmap identifies which regions are important, which helps in model verification or to identify any potential bias. The input 402 may be identified, in this exemplary embodiment, as the handwritten digits '6' and '8'. The inputs are highlighted, and the edges of the digit are detected via a change in colors between the digit and the background in which the digit is provided.

In a first step, the raw XNN feature attribution 404 may be derived for each input. For reference, unstandardized, or "raw," feature attribution, which is derived from the coefficient, may represent the amount of change in a dependent variable based on the amount of change in an independent variable. The raw XNN feature attribution 404 in this case may correspond to the degree to which there is a change in colors at each zone of the input, which may of course be greatest at the boundaries of the handwritten digits. Thus, as this data is further refined and visualized, it may come to resemble an outline of each of the handwritten digits shown in the input FIG. 402.

The raw XNN feature attribution 404 is extracted from the product of the XNN coefficients and the output of the convolution. Thus, the raw XNN feature attribution 404 may essentially replace the "flattened concepts" step 310 in FIGS. 3A and 3B, prior to the execution of the one or more pooling and convolution steps in FIG. 3B that are used as part of "back-mapping" the feature attribution data back to the original input in order to identify which concepts and features of the input ultimately led to the resulting output. In this case, it may be observed that, in the example where a '6' is being identified, the primary feature of the input that led to the identification is the lower part of the hand-drawn '6,' such that the symbol has a curved bottom that appears with a higher intensity in the resulting convolution visualization, and, in the example where an '8' is being identified, the primary features of the input that led to the identification are the presence of four different line levels of the symbol, identifying a top part of the '8,' a bottom part of the top loop of the '8,' a top part of the bottom loop of the '8,' and a bottom part of the '8.' In the represented example, this may allow a system operator to better take charge of the system's learning process; for example, if the system has learned to identify a '6' based on features that might also be present in a '0' and '8' (the bottom curve), the operator may wish to further train the system in order to ensure that '6' can be properly distinguished from '0' and from '8.'

The exemplary embodiment in FIG. 4B may show a backmap applied to pooling layers in order to distribute the feature attribution on the neurons of the previous layer. For the purposes of illustration, the input in this exemplary embodiment may be represented as a matrix of numbers. The input in this example is pooled into 4 groups, and each group is represented by a quadrant. For example, the top left quadrant of the map 700, containing the values 29, 15, 0, and 100, is one pooled group of similar features. The other three quadrants also each contain 4 values. Once the input has attained the maximum pooling possible, each pool of similar features may be represented by the most prominent feature. In this example, the most prominent feature of each pool is the one with the highest value. Matrix 701 shows a simplified representation of the features, where each pool is represented by a single value. Next, the weights 702 for each feature are identified and extracted from the XNN (or any explainable model). The weights in step 702, may also be the result of the backmap from a prior step. Then, the input matrix 700 is multiplied by the weights 703, where each input feature is multiplied by the corresponding weight, and the product is then divided by the value of the most prominent feature matrix 704 in order to identify the feature attribution value for each feature, as shown in the matrix 705. The first matrix 700 in FIG. 4B is the input which is given to the Pooling Layer within a CNN-XNN architecture. An exemplary CNN-XNN may consist of the following layers, in order: input→convolution→pooling→convolution→pooling→XNN, and data may be taken as it flows through the network. Thus, the input 700 may be the output of a convolutional layer, such as a set of convoluted input data. Since this is a backmap, the data is already known in each step during the forward pass operation.

Similarly, the exemplary embodiment in FIG. 4C may show a backmap applied on convolutional layers. Referring now to exemplary FIG. 4C, the final output of the convoluted backmap features may be the sum, mean, or some other aggregate operation, of the backmap features 56, 503, 1161 and 328, as shown in the feature map 416. It may also be noted that convolution filters may consist of multiple kernels. A similar aggregation operation may be applied to group multiple kernels for the purpose of feature attribution and the backmap operation. Such steps may be applied sequentially, depending on the type of layer found in the original CNN-XNN network. The mapping may be applied until it reaches the original input, which would enable the conceptual feature importance to be mapped back to the original input.

Feature attribution is the product of the coefficients and the input data values. In an exemplary CNN-XNN, the input data may be the output of the CNN network. In FIG. 1, the output of the CNN 104 and the input to the XNN 108 may be the data. Feature attribution may identify the importance of a given feature with respect to the result. When detecting bias, feature attribution may need to be normalized so that it may be correctly visualized or represented graphically to the user.

Still referring to the exemplary embodiment in FIG. 4C, the reverse map or backmap may be shown for each input feature. In FIG. 4C, the input to the convolutional layer 412 may be convoluted into kernels 414 until it eventually consists of a large feature map 416. The feature map 416 may then be reversed according to each feature. The exemplary backmap in FIG. 4C illustrates a backmap for feature 56. First, the input 412 is taken. At the center of the input 412 is the number 18. Input feature 18 is convoluted and analyzed based on the surrounding inputs to form kernel 414 and a feature map 416. The feature map 416 shows feature 56 along with 3 other features. The weights/feature attribution 702 are the weights which ultimately give the answer if activated. For example, the weight given to feature 56 is 0.1. The exemplary calculation in FIG. 4C thus involves multiplying the input value (18) by the kernel value (8) and the feature attribution value (0.1), and then dividing the result by the value of the feature (56), such that the final result is derived from the relation 0.1*18*8/56. In this exemplary case, the final result is 0.26, which may represent the impact that input feature 56 has on the corresponding output.

In processing a backmap, the values are already known during the forward pass. That is, input 412, kernel 414 and feature map 416 are already known prior to the backmap. All of these are determined in the forward pass operation of the neural network. In this exemplary case, the input matrix 412 represents the input which was used during the convolution operation. The equation that results in the feature map is done by the convolutional layer. A similar concept applies when applying backmap to pooling as shown in FIG. 4B. The main intuition behind the equations shown in FIGS. 4B and 4C is to distribute the feature attribution in a proportional manner.

The ratio of the feature map value to the feature's weight may be equal to the ratio of the kernel multiplied by the initial input value to the feature attribution value. Thus, if sub-matrix [[1,3,9], [6,18,32], [4,39,17]] has a feature attribution of 0.1 when the feature map is 56, then 56 divided by 0.1 (the feature map value divided by the feature weight) must equal the input value multiplied by the kernel value divided by the feature attribution value. Since the input value and kernel value, feature map value, and weights are already identified in the forward pass, the reverse convolutional layer need only to solve for the feature attribution value. Solving the previously described equation for the feature attribution value identifies that the feature attribution value is equal to the product of the initial input value, the kernel value, and the weight, divided by the feature map value. In this exemplary embodiment, this may be resolved as: $0.1*18*8/56=0.26$. By identifying the feature attribution value as such, as opposed to directly using the weight values, an explainable system may better interpret the impact that features had on the output by normalizing or distributing the feature attribution in a proportional manner.

The reverse indexing mechanism may be useful for generating explanations and detection bias either in the form of heatmaps or in some form which considers the actual convoluted filters when generating explanations. The convoluted features may be useful for detecting strokes, edges or patterns which may then fuel the explanation generation process which could be visual, textual, audio, etc. The use of reverse indexing mechanism is not limited to CNN-XNN only, but may be applied to other XNN variants.

As previously described in FIGS. 3A and 3B, the next step in the backmap may involve one or more pooling and convolution layers. Once multiple sets of raw XNN coefficients/feature attribution 404 have been extracted from the input. The XNN coefficients multiplied by the CNN output data 104, generate the feature attribution 404 that are attributed to a region in the input multidimensional data, which input region may be contiguous or non-contiguous, are then mapped back to the original input data 402 via the backmap.

The raw XNN feature attribution 404 may then be backtracked by the backmap, using unpooling for pooling layers 308, and deconvolution or transpose convolution for convolution layers, in such a way that different elements of the input may be pooled or grouped based on similar features, and then convoluted 306, where elements of the input are identified and extracted. In an exemplary embodiment, this may be an iterative process, and one or more pairings of pooling 308 and convolution 306 steps may be contemplated for use in variants of the provided system. An exemplary embodiment may present two pooling and convolution layers, however, it may be contemplated that more or fewer layers or repetitions of layers may be implemented, depending on the application. As noted above, this may further refine the raw coefficients/feature attribution 404 into more interpretable data, which in this case may generally resemble an outline shape for each of the handwritten digits submitted as input FIG. 402. (It may of course be contemplated to apply such a system to numerous other applications, such as those previously contemplated herein; for example, instead of having the system operate to determine the contours of a handwritten digit, it may be contemplated to employ a similar system for use in medical image analysis of a person's physiology as in the example provided in FIGS. 3A and 3B.) The raw coefficients 404 can be used to generate an explanation directly without any further need of additional information. However, the addition of the backmap information and the mapping to the original regions of the multidimensional into data allows for more sophisticated and better interpreted explanations to be generated.

Bias detection may be facilitated by combining the backmap with Kernel Labelling, where different kernels are labelled with a symbol, which may form the basis of a symbolic hierarchy involving kernel labels, symbols and concepts. Backmap may also be used to efficiently identify segments and regions of interest that occur in the multi-dimensional input data, to help practical identification of symbols and concepts. Such symbolic knowledge may be combined and projected both as part of the output results and also projected backwards from the output classification results back to the input space. Any identified segments and regions may facilitate the identification of bias in an XAI model, by assisting the interpreter with potential biased segments and/or regions, in the input space, where the model is focused for prediction.

In an exemplary embodiment for a medical application, the image pixels that are deemed to be the most important for the classification output may be highlighted by the Kernel Labeler to project relevant elements of the output explanation and/or interpretation back to the input space, making it easier for system users to understand any potential bias and comprehend the resulting explanation and/or interpretation.

The Backmap process may be computed with the addition of causal data from one or more causal models to facilitate bias detection. It may be further contemplated that a combination of domain knowledge and world knowledge may be utilized as part of the reconstruction process.

The Backmap process may use human knowledge injection to identify segments in the input space of a CNN-XNN architecture or similar XNN or XAI model. Human defined 2D or 3D segments or multi-dimensional segments may be morphed and adapted for each input image, point cloud or appropriate input to an appropriate XNN. Morphing may be aided through the identification of the edges of human defined segments using techniques such as Sobel edge detector, Prewitt edge detector and Canny edge detector. Morphing may be further enhanced with the addition of appropriate end-to-end gradient descent visually and spatially oriented training methods. Morphed segments may facilitate the detection of bias to the explainer and/or interpreter, as the feature attributions may be combined for each morphed segment. The explainer and/or interpreter may use the combined score of each morphed segment to calculate the amount of bias in each segment, in the input space.

Explanations containing backtracked information may be filtered to facilitate the detection of certain level of bias. In an exemplary medical application embodiment, a CNN-XNN architecture may be used to classify X-Ray images. During the Backmap process, a notch filter may be used to only retain explanations on the lower end and the upper end, to facilitate the detection of bias for the specified criteria.

The Backmap process may form a path that represents the importance of kernel features, symbols, and concepts for a particular classification label. To facilitate bias detection, the generated paths may be clustered in N dimensional space, using unsupervised learning techniques such as K-Means clustering, agglomerative clustering or hierarchical clustering algorithms, to identify groups of paths that lead to a particular classification label. The groups of paths may be represented by the feature attributions of the input image in order to assist the interpreter identify the reason for the clustered paths. It is further contemplated that a suitable Model Discovery or AutoXAI process may be used to enhance this type of bias detection using path analysis within an XAI model.

It is further contemplated that the Backmap process may be used for monitoring bias during the training phase of a CNN-XNN architecture. In an exemplary medical application embodiment, a CNN-XNN architecture may be used to classify X-Ray images. The feature attributions of the input features to the XNN component may be backtracked to the input image for each epoch, during the training phase, allowing potential bias in the gradual development of the pixel feature importance to be monitored for each classification label.

Referring now to exemplary FIG. 5, an exemplary hierarchal partition may be shown. In an exemplary embodiment, hierarchal partitions may be represented in a nested or flat rule format.

An exemplary nested rule format may be:
if x≤20:
   if x≤10:
      $Y_0 = \text{Sigmoid}(\beta_0 + \beta_1 x + \delta_1 y + \beta_3 xy)$
   else:
      $Y_1 = \text{Sigmoid}(\beta_4 + \beta_5 xy)$
else:
   if y≤15:
      $Y_2 = \text{Sigmoid}(\beta_6 + \beta_7 x^2 + \delta_8 y^2)$
   else:
      $Y_3 = \text{Sigmoid}(\beta_0 + \beta_{10} y)$ Alternatively, a flat rule format may be implemented. The following flat rule format is logically equivalent to the foregoing nested rule format:

Rule 0
if x≤10:
   $Y_0 = \text{Sigmoid}(\beta_0 + \beta_1 x + \rho_2 y + \beta_3 xy)$
Rule 1
if x>10 and x≤20:
   $Y_1 = \text{Sigmoid}(\beta_4 + \beta_5 xy)$
Rule 2
if x>20 and y≤15:
   $Y_2 = \text{Sigmoid}(\beta_6 + \beta_7 x^2 + \beta_8 y^2)$
Rule 3
if x>20 and y>15:
   $Y_3 = \text{Sigmoid}(\beta_9 + \beta_{10} y)$ The exemplary hierarchal architecture in FIG. 5 may illustrate a rule with two layers. To illustrate an exemplary implementation of the architecture, let x=24 and y=8. In this exemplary embodiment, the first layer 500 contains only one rule or partition, where the value of x is analyzed, and determines which partition of the second layer 510 to activate. Since x is greater than 20, the second partition 514 of the second layer 510 is activated. The partition 512 of the second layer 510 need not be activated, and the system does not need to expel resources to check whether x≤10 or x>10.

Since the partition 514 was activated, the value of y may be analyzed. Since y≤16, $Y_2$ may be selected from the answer or value output layer 520. The answer and explanation may describe $Y_2$, the coefficients within $Y_2$, and the steps that led to the determination that $Y_2$ is the appropriate equation. A value may be calculated for $Y_2$.

FIG. 6 may provide illustrated definitions for $R_0$ to $R_3$ in the form of a prediction network 600. In a prediction network 600, the input features 601 or transformed features 602, such as $x^2$, $y^2$, xy, x, and y, are weighted by the weight coefficients 604 $\beta_0$ to $\beta_{10}$, in order to produce the rules 606 $R_0$ to $R_3$. The resulting values for rules $R_0$ to $R_3$ may be combined and/or outputted in a value output layer 608.

A conditional network 610 defines the conditional portion of the ruleset. The conditional network 610 may include three main layers that can be combined depending upon the implementation constraints. The conditional layer 612 is initialized according to the hierarchy of partitions being implemented in the XNN. The aggregation layer 614 is initialized for the first time by the process that defines the XNN and can be subsequently refined using gradient descent methods, such as back propagation. The conditional network may be trainable or non-trainable. In the latter case, when applying back-propagation, the partitions remain static and only the value/prediction network is refined.

The conditional layer 612 may be initialized through the "if" conditions defined in the XAI model. For example, "if x≤10" may be defined in the XAI model and will generate a neuron in the transformed XNN model for x≤10. An "if" condition with x>10 and x≤20 will generate the aggregated neuron in the aggregation layer 414 for [x>10, x≤20]. The output of each neuron may be either 1 or 0. The switch output layer 616 combines the results of the aggregation layer 414 and conditional layer 612.

As illustrated in exemplary FIG. 6, each condition may be split into partitions. Each neuron in the conditional layer 612 may represent a single partition. For example, "y>15" may be a single partition, representing a single rule which applies where "y>15" (and, thus, not in the alternative case where y≤15). Then, the partition may be combined with another partition in the aggregation layer 614. In the aggregation layer 614, the partition "y>15" is combined with the partition "x>20". These two partitions are then combined to create S3, in the switch output layer 616.

The resulting combination may produce a set of values 620, $V_0$ to $V_3$ in this exemplary embodiment. The set of values 620 may be further modified by the weights $P_0$ to $P_3$, in order to produce a result 622. The weights may also or alternatively be non-trainable and set to a fixed value of 1. The decision on what weights can be trainable (and thus changeable by the AI system) and what is non-trainable (and thus non-changeable by the AI system) can always be made under human control and supervision. Finally, the result may be modified by an activation function 624. Having the XNN structure logically equivalent to the XAI ruleset allows for the XNN structure to be directly converted to a system of rules within an expert system.

In another exemplary embodiment, bias detection applied on text classification may highlight which keywords are prominent in the resulting classification model. It may be noted that a particular text classifier is highly sensitive to specific words or symbols. In an alternate exemplary embodiment, bias may also be reported in the form of a textual description.

In yet another embodiment, data matrices and datasets may be marked-up in some form of markup language to indicate the bias and amount of bias, together with an optional predecessor graph to denote dependencies amongst different items of data and/or features that may be causing bias.

In another exemplary embodiment, a causal model, typically represented as a Directed Acyclic Graph (DAG) or some other equivalent form, like a Structural Causal Model (SCM), may be marked-up with sources of bias. The causal model can be combined with marked-up data, and the bias predecessor graph extended to the causal model for a deeper understanding of the underlying sources of bias. Marked-up causal models may reveal a new perspective on the bias when observed from a generative, simulation point of view instead of just a statistical correlation point of view. Causality may also reveal hidden unknown features which are causing potential bias. Causal models may also be used to understand and analyze the type of adjustments and potential interventions needed to correct for the different types of bias and also suggest ways of eliminating or minimizing such bias. Possible embodiments involving the merging of causal models with white-box and grey-box models can lead to better detection of bias, while simultaneously enabling powerful bias correction and adjustment techniques that are normally outside of the realm of what can be achieved using non-causal statistical methods and typical machine learning methods.

In another exemplary embodiment, bias may also be shown directly on pictures, diagrams, videos, and other types of visual aids. Appropriate diagrams may be marked-up, synthesized or created in order to illustrate the bias and its potential sources. Comparisons may be made for illustrating bias. For example, referring back to the exemplary system which differentiates between a Husky and a wolf, by displaying an image of a Husky in a snow scene and then another of a Husky on a sandy beach scene may properly illustrate the effect of snow on the model bias. In an alternate example, the system may create a computer aided design (CAD) diagram of an engine, showing what parts and/or processes are affected by some specific type of measurement bias.

In yet another exemplary embodiment, bias may be analyzed in the form of root cause analysis (RCA) diagrams and related or similar methods such as fault-trees, Feynman diagrams, etc., that show how bias may affect or may be affected by other processes, variables, and other items in a modeled system.

Exemplary embodiments may identify bias towards certain groups and may also explain said bias. AI models need to be trusted before they can be implemented in mission critical applications, where lives may hang in the balance. Modelling, and subsequently eliminating bias are crucial steps in increasing trust in AI. By identifying the bias, new applications for AI may be validated. Further, transparent AI improves the model creation process by providing information about the bias, such as whether it arises from the dataset or from the model itself, thus facilitating a user in eliminating the bias from the source.

The identification of bias can also help reduce the bias-variance tradeoff that is prevalent in machine learning systems. The resulting analysis of bias from an exemplary embodiment helps in prioritizing the focus on reduction of both bias and also variance in the machine learning model.

The bias identification and mitigation system uses a system of constraints that may be statically provided upon startup, or generated statically, or filled in and generated dynamically at run-time. Constraints may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis. Constraints may also be implemented in form of a data structure that references the different features and variables accessible to the explainable model and any associated taxonomies, ontologies and causal models. Constraints may also be implemented in the form of knowledge graph networks. Other constraints may also be implemented on the basis of useful heuristics, such as control charts, Nelson rules, Bode plots, Nyquist plots and related methods that determine whether some measured variable is out of control—i.e. giving a measure of unpredictability versus consistency, which may be highly useful in a practical implementation of a bias detection and mitigation system.

In an exemplary embodiment, additional transforms and normalization/standardization may be applied to enhance the bias detection and mitigation system performance and the strength and weakness detection and mitigation system performance, such as categorical encoding, continuous data bucketization, rotational invariance and rotational adjustments, dimensional and dimensionless scaling and scaling adjustments, translational invariance and translational adjustments, and translational equivariance adjustments, together with other suitable constraint transformations.

An exemplary embodiment may also utilize a taxonomies and ontologies component to enhance information in the model and provide a practical solution to the standardization of information to all the system inputs and outputs. It may be further contemplated that the bias detection and mitigation system and the strength and weakness detection and mitigation system may use taxonomies and ontologies to represent constraints, transformations and mappings between taxonomies and ontologies to facilitate the conversion and translation of taxonomical and ontological data between different taxonomies and ontologies.

In another exemplary embodiment, taxonomies and ontologies may also be used to link taxonomies and ontologies to causal models, and/or hypotheses and concepts, thus combining the element of cause-and-effect analysis within the hierarchical structuring provided by taxonomies and ontologies. This causal model link may be used to improve the creation and enhancement of casual models and improve the resulting quality of the bias and/or strength and weakness detection and mitigation.

It may be further contemplated that the bias and strength and weakness detection and mitigation system may utilize taxonomies and ontologies to extend the explainable models outputs with taxonomy trees, networks and graphs and ontological trees, networks and graphs. It may be further contemplated that taxonomies and ontologies may be utilized in a practical implementation by blending and fusing knowledge found in taxonomies and ontologies with human and machine-generated knowledge, which in an exemplary implementation, may be implemented with a combination of symbolic knowledge, rule and expert systems, workflow systems and suitable HKI implementations.

In an exemplary embodiment, an exemplary bias and/or strength and weakness detection and mitigation system may use the OECD taxonomy of knowledge classes and the Suggested Upper Merged Ontology (SUMO) merged with the YAGO ontology (YAGO-SUMO) as default base taxonomies and ontologies that are then extended according to the specific application implementation.

In an exemplary embodiment, a bias and/or strength and weakness detection and mitigation system may implement audit log functionality. An exemplary application of such audit log information is in the creation of decision logs and trace paths that clearly illustrate the flow, interactions and behavior of the detection and mitigation system to come up with the justification behind the identification of a particular type of bias and the actions needed to mitigate it. It is contemplated that trace paths may be implemented in expert systems and rule-based systems as an annotated sequence of rules that have been triggered and executed. It is further contemplated that trace paths may be implemented in workflow systems as an annotated sequence of workflow nodes and paths that have been executed by the workflow engine. The trace path can be used to illustrate just the precise sequence and behavior of the bias and/or strength and weakness detection and mitigation system or may be implemented and configured to display nearest neighbors along the path that may be of interest to the user.

In an exemplary embodiment, a bias and/or strength and weakness detection and mitigation system creates and transmits a tamper-proof record to an independent System of Record. A practical implementation of such a system may utilize a combination of Distributed Ledger Technology (DLT), a private blockchain, a public blockchain, secure audit database, secure audit log system, a TPM module, hardware secure module (HSM), smartcard module, SIM card, or a suitably tamper-proof implementation device. Cryptographic and encryption methods may be applied to enhance the security of such an implementation. Hashing and checksum methods may also be applied to enhance the security of such an implementation. It is further contemplated that such an explainable bias and/or strength and weakness detection and mitigation system with a tamper-proof System of Record may be implemented in a manner that is compliant with relevant country-specific, industry-specific or international standards, such as FIPS 140, FIPS 140-2, FIPS 140-3, IEEE P1363, IEEE P1619, ISO 19092, ISO/IEC 18014, PCKS, EIDAS, ESSIF and other relevant standards.

In an exemplary embodiment, a bias and/or strength and weakness detection and mitigation system may receive inputs from a workflow system while also optionally being triggered by a workflow system. It is also contemplated that the bias and/or strength and weakness detection and mitigation system may output information to a workflow system, including both flow data, process data and workflow related data and state data while also optionally triggering actions and workflows in the workflow system or workflow engine.

It is contemplated that the bias detection and mitigation for XAI systems may be implemented directly as a hardware circuit either using (i.) flexible architectures like FPGAs, or (ii.) more static architectures like ASICs or, or (iii.) neuromorphic architectures that are suited for the hardware implementation of connectionist models such as XNNs, or (iv.) quantum computing hardware.

In an exemplary embodiment utilizing FPGAs, a bias and/or strength and weakness detection and mitigation system may perform and execute various monitoring, assessment, identification and mitigation functions and tasks on an explainable model that may also be implemented in the same FPGA based system or an appropriately connected system via a network link or other appropriate telecommunications link. In such an embodiment, updates may be possible via reconfiguration of the FPGA system itself, while some form of local or remote memory may be utilized to save interim results, configurations and results.

In an exemplary embodiment utilizing ASICs, a bias and/or strength and weakness detection and mitigation system may perform and execute various monitoring, assessment, identification and mitigation functions and tasks on an explainable model that has been also implemented in the same ASIC package, or embedded on the same local hardware bus, or an appropriately connected system via a network link or other appropriate telecommunications link. In such an embodiment, some form of local or remote memory may be utilized to save interim results, configurations and results. An ASIC implementation of the connectionist model part of the system may utilize some form of memory to save and reconfigure weights in such a model, unless they are implemented hard-coded in hardware. An ASIC implementation of the symbolic part of the system may utilize some form of memory to save and reconfigure variables and symbol values in such a model, unless they are implemented hard-coded in hardware.

In an exemplary embodiment utilizing neuromorphic hardware. a bias and/or strength and weakness detection and mitigation system may perform and execute various monitoring, assessment, identification and mitigation functions and tasks on an explainable model that has been also implemented in the same neuromorphic system, or embedded on the same local hardware bus, or an appropriately connected system via a network link or other appropriate telecommunications link. In such an embodiment, some form of local or remote memory may be utilized to save interim results, configurations and results. A neuromorphic implementation of the connectionist model part of the system may utilize the neuromorphic hardware memory to save and reconfigure weights in such a model. A neuromorphic implementation of the symbolic part of the system may utilize some form of conventional memory or utilize the neuromorphic weights to save and reconfigure variables and symbol values in such a model.

In an exemplary embodiment utilizing quantum computing hardware, a bias and/or strength and weakness detection and mitigation system may perform and execute various monitoring, assessment, identification and mitigation functions and tasks on an explainable model that has been also implemented in the same quantum computing system, or embedded on the same local hardware bus, or an appropriately connected system via a network link or other appropriate telecommunications link. In such an embodiment, some form of local or remote memory may be utilized to save interim results, configurations and results. A quantum system implementation of the connectionist model part of the system may utilize a combination of classical and quantum hardware memory to save and reconfigure weights in such a model. A quantum system implementation of the symbolic part of the system may utilize some form of classical or quantum hardware memory to save and reconfigure variables and symbol values in such a model.

It is contemplated that a bias and/or strength and weakness detection and mitigation system implemented on a quantum processing system will have rules and characteristics that are similar to classical explainable models with the addition of quantum specific extensions. For example, such an extension may allow for the specification of quantum annealing effects and their correct interpretation. In another example, an extension may allow for the correct interpretation of multiple qubit states, qubit basis states, mixed states, Ancilla bits, and other relevant quantum effects due to entanglement and/or decoherence. In another example, an extension may allow for the introduction of quantum logic specific operators and/or hardware logic gates within an XAI model, or an appropriate implementation such as an XNN model, such as quantum CNOT, CSWAP, XX, YY, ZZ gates, Pauli gates, Hadamard gates, Toffoli gates and other relevant quantum logic operations that may be combined serially or in parallel. Furthering these examples, such quantum specific extensions may be implemented in various parts of the bias and/or strength and weakness detection and mitigation system, for example by having quantum extended versions of bias detection and mitigation methods and strength and weakness detection and mitigation methods. Quantum extended versions of bias detection methods may take advantage of quantum processing implementations, to evaluate multiple bias scenarios in significantly fewer processing steps needed than possible on a classic processing implementation, or to evaluate multiple counterfactuals and causal models in fewer steps than possible on a classic processing system. Quantum extended versions of bias mitigation methods may take advantage of quantum processing implementations to perform multiple pruning steps, reweighting steps, reconstruction and modification of the XAI model and other mitigation methods in significantly fewer processing steps needed than possible on a classic processing implementation. Quantum extended versions of strength and weakness detection methods may take advantage of quantum processing implementations, to evaluate multiple dataset scenarios and possibilities in significantly fewer processing steps needed than possible on a classic processing implementation, or to utilise the additional representation capabilities of qubits to perform dataset and input-output space searches in far fewer steps than possible on a classic processing system. Quantum extended versions of strength and weakness mitigation methods may take advantage of quantum processing implementations, to generate multiple dataset mitigation scenarios and possibly generate synthetic data in significantly fewer processing steps needed than possible on a classic processing implementation.

In another exemplary embodiment, a bias and/or strength and weakness detection and mitigation system may be used to process XAI models that handle various types of sequence data, including temporally ordered data or sorted data that has been ordered via one or more sequencing criteria. Sequence data may include a number of data points which contain feature data in various sequential formats including, but not limited to: 2D data, 3D data, transactional data, sensor data, image data, hyper-spectral data, natural language text, video data, audio data, haptic data, LIDAR data, RADAR data, SONAR data, and the like. Data points may have one or more associated labels which may indicate the output value or classification for a specific data point or a continuous or non-continuous interval of data points. Data point sequences may result from an internal and/or external process that may output a combination of synthetic data points, perturbed data, sampled data, or transformed data. Temporal data may contain useful information that may be used in the mitigation of certain types of biases, such as behavior bias, analytical and detection bias, systematic bias and omission bias. It is further contemplated that the use of temporally ordered data may be used in combination with causal models to help mitigate bias in the correct cause-and-effect order.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for detecting bias from an explainable model comprising at least one of a neural network, explainable artificial intelligence model, or machine learning algorithm, comprising executing on a processor the steps of:
   attributing values to one or more input features, wherein the input features are a plurality of features extracted from an input to the explainable model;
   forming an input matrix from the values of the one or more input features;
   extracting one or more coefficients from the explainable model,
   identifying one or more weights from the coefficients;
   forming a weight matrix, comprising the weights identified from the coefficients;
   multiplying the weight matrix by the input matrix to form a weighted input matrix comprising a plurality of weighted input values corresponding to the input features;
   identifying a highest value from the weighted input matrix and dividing each of the weighted input values by the highest value to form a feature attribution matrix comprising a plurality of feature attribution values;
   identifying bias based on the feature attribution matrix; and
   forming a plurality of explanations based on the weights, and presenting the explanations to a user.

2. The method for detecting bias from an explainable model of claim 1, further comprising presenting, to a user, the feature attribution matrix.

3. The method for detecting bias from an explainable model of claim 1,
   wherein the plurality of feature attribution values is associated with an importance ranking of feature attribution values and comprises a set of one or more most important feature attribution values; and
   further comprising forming a feature importance vector, the feature importance vector comprising the set of one or more most important feature attribution values, and
   and wherein the identified bias is at least one of a measurement bias, algorithmic bias, omission bias, spectrum bias, selection bias, analytical and detection bias, reporting and data availability bias, systematic bias, bias associated with image dataset, data bias, capture bias, category bias, negative bias, label bias, representation bias, adversarial bias, behavior bias, and bias associated with a strength and weakness of a system.

4. The method of claim 3, further comprising combining one or more feature attribution values using a summarization technique, and determining a level of fairness using one or more bias detection techniques, wherein the level of fairness is provided in a result of a diagnosis for assessing output results and explanations from the explainable model.

5. The method of claim 3, further comprising forming a bias report based on the feature importance vector and inputting the feature importance vector to focus a genetic algorithm onto a portion of the explainable model.

6. The method of claim 3, further comprising linking the identified bias with one or more errors or deviations in output results of the explainable model, wherein the linking further provides a bias report comprising a root cause analysis (RCA) diagram associated with one or more reporting formats;
   applying robust statistics to mitigate the identified bias associated with distribution shifts, wherein the robust statistics comprise one or more of trimmed estimators, Winsorizing, M-estimators, L-estimators, and imputation;
   applying an explainable auto-encoder/decoder (XAED) for re-training the explainable model, wherein the XAED is configured to reconstruct errors associated with the explainable model used for identifying the bias.

7. The method of claim 3, further comprising, for each feature attribution value in the feature attribution value matrix, executing the steps of:
   identifying the input feature associated with the feature attribution value in the feature attribution value matrix,
   removing the identified input feature from the input to form an updated input, and inputting the updated input into the explainable model, recording a model performance or accuracy of the model, and comparing the model performance associated with the updated input to an original model performance associated with the input.

8. The method of claim 1, wherein the input features comprise a plurality of convoluted features from the input.

9. The method of claim 1, wherein the input features are an output of a convolutional layer of a convolutional neural network.

10. The method of claim 1, further comprising forming a map vector, wherein the map vector correlates the values of the feature attribution matrix with corresponding values of the input matrix.

11. The method of claim 1, further comprising, before the step of attributing values to the input features, splitting the input features into a plurality of sets of input features.

12. The method of claim 1, further comprising validating the identified bias based on a validation dataset in accordance with a second model comprising an explainable architecture, wherein the second model is configured to provide an explanation of the validation process in relation to one or more validated data points of the input.

13. The method of claim 12, further comprising repeating the steps in one or more iterations using one or more additional input samples, and comparing the results of each iteration, and presenting to a vector of the feature attribution values from each iteration sorted in descending order by value.

14. The method of claim 1, further comprising inputting the identified bias to a bias treatment framework configured to mitigate bias and enforce fairness and acceptability associated with mitigating the bias, wherein the framework is configured to ensure i) procedural fairness, ii) outcome fairness, and iii) impact discrimination when mitigating the bias;
    wherein the bias treatment framework comprises at least one type of risk-assessment framework or identification-assessment-action matrix; and
    applying measures and metrics based on Key Ethics Indicators (KEIs) to enable an assessment of the explainable model, wherein the explainable model is assessed against one or more stated trustworthy and ethical objectives and an extent of compliance with KEIs when mitigating the bias.

15. The method of claim 1, further comprising identifying, based on the feature attribution matrix, one or more biased features, and re-training the explainable model by re-weighting one or more weights of the explainable model after modifying a structure of the explainable model to eliminate or mitigate bias based on the one or more biased features.

16. The method of claim 15, wherein the step of identifying one or more biased features comprises presenting the feature attribution matrix to a user and receiving user input indicating the one or more biased features, or applying a control swap for assessing output and explanations from the explainable model.

17. The method of claim 16, further comprising receiving user input indicating a rule, and inserting the rule to the explainable model.

18. The method of claim 1, further comprising normalizing the input features or the feature attribution matrix to a common scale, wherein the common scale implements min/max range scaling or z-score normalization.

19. The method of claim 1, further comprising determining a classification of strength and weakness for prioritizing input data to the explainable model based on the identified bias, wherein the classification is determined based on a quality of the input data in relation to the identified bias.

20. The method of claim 1, wherein the input is an image or video, further comprising forming a heatmap based on the feature attribution matrix, and presenting the heatmap overlayed on the input to a user, and further comprising applying a reverse index mechanism to identify bias using one or more backmaps, wherein the one or more backmaps are configured to identify bias in kernels, activation maps, branching layers, and/or input data.

21. The method of claim 1, further comprising forming and/or utilizing at least one causal model based on the feature attribution matrix and the input feature matrix applying the at least one causal model with the explainable model to identify the bias; and
    correcting the bias to mitigate or reduce one or more effects of the bias;
    wherein the at least one causal model comprises a mixture of causal diagrams representative of a black-box model, wherein the mixture of causal diagrams is used to parametrize a group of models or sub-models corresponding to the black-box model;
    wherein the at least one causal model is configured to identify the bias using counterfactuals, wherein the at least one causal model based on the counterfactuals is further configured to determine one or more results from the black-box model from any of: i) at least one part of the black-box model, ii) a related model of the black-box model, and/or iii) a sub-part of the black-box model, wherein the results of the black-box model are configured to be transferred or transposed directly or via the appropriate modification, conditioning, allowance or transformation; and
    further comprising applying mediation analysis in relation to at least one causal model, wherein the mediation analysis comprises sub-division of counterfactuals, including direct and indirect effects of both interventional and counterfactual modifications.

22. The method of claim 1, further comprising: monitoring the identified bias for a time period; providing a self-certification and verification of the bias, flagging instances of the bias and providing a risk score associated with the instances, and/or detecting instances of the bias where a model input and output exhibit a discrepancy exceeding a predetermined threshold or tolerance level causing a distribution shift.

23. The method of claim 1, further comprising:
    generating a bias mitigation explanation based on the identified bias, where the bias mitigation explanation comprises at least one type of explanation associated with i) an assumption being made by the explainable model about construct space, ii) one or more constraints governing a mapping inferred by the explainable model between construct space and observed space, iii) limits and constraints about a continuity and discontinuities in the mapping inferred by the white-box model between construct space and observed space, iv) assumptions being input by a user indicating acceptability and/or fairness; and/or v) costs, impacts, risks associated with each acceptability and/or fairness indication.

24. A method for detecting bias from an explainable model comprising at least one of a neural network, explainable artificial intelligence model, or machine learning algorithm, comprising executing on a processor the steps of:
    splitting an input into a plurality of sampling groups;

for each of the plurality of sampling groups, executing the steps of:

attributing values to one or more input features of the sampling groups, wherein the input features are a plurality of features extracted from a portion of the input corresponding to the sampling group;

forming an input matrix from the attributed values of the one or more input features;

extracting one or more coefficients from the explainable model, identifying one or more weights from the coefficients;

forming a weight matrix, comprising the weights identified from the coefficients;

multiplying the weight matrix by the input matrix to form a weighted input matrix comprising a plurality of weighted input values corresponding to the input features, producing one or more explanations based on the weight matrix and the input matrix.

25. The method of claim 24, further comprising comparing the one or more explanations of each sampling group, and identifying one or more differences in the input features of each of sampling group, and identifying bias based on one or more differences in the explanations of each sampling group and the differences in the input features of each sampling group; and presenting, to a user, the one or more explanations of each sampling group.

26. The method of claim 24, wherein the plurality of sampling groups comprises a same proportion of a plurality of sample classes.

27. The method of claim 24, wherein the splitting the input into sampling groups is implemented using a random splitting method.

28. The method of claim 24, further comprising, for each of the plurality of sampling groups, executing on the processor the steps of:

training the explainable model using the sampling group, inputting a sample input to the explainable model after training, and outputting a plurality of sample outputs and sample explanations from the explainable model, wherein the sample input is constant for each of the plurality of sampling groups; and presenting, to a user, the sample outputs and sample explanations corresponding to each sampling group.

29. The method of claim 28, further comprising comparing the sample outputs and sample explanations corresponding to each of the plurality of sampling groups, and identifying bias based on one or more differences in each sampling group's sample outputs and sample explanations.

30. A method for detecting bias from an explainable model comprising at least one of a neural network, explainable artificial intelligence model, or machine learning algorithm, comprising executing on a processor the steps of:

identifying a plurality of coefficients based on a plurality of feature attributions from an output of the explainable model;

identifying a plurality of concepts associated with the coefficients;

upsampling and deconvoluting the plurality of concepts to identify one or more input features associated with the concepts; and correlating the input features with the feature attributions based on the identified coefficients and concepts associated with each input feature.

* * * * *